(12) United States Patent
Uramoto et al.

(10) Patent No.: US 8,935,268 B2
(45) Date of Patent: Jan. 13, 2015

(54) CONTROLLING DISCLOSURE OF TRACE DATA RELATED TO MOVING OBJECT

(75) Inventors: Naohiko Uramoto, Kanagawa-ken (JP); Yuji Watanabe, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 13/351,335

(22) Filed: Jan. 17, 2012

(65) Prior Publication Data

US 2012/0197873 A1 Aug. 2, 2012

(30) Foreign Application Priority Data

Jan. 31, 2011 (JP) ................................. 2011-018948

(51) Int. Cl.
*G06F 17/30* (2006.01)
*H04W 4/02* (2009.01)
*G06Q 50/30* (2012.01)
(Continued)

(52) U.S. Cl.
CPC ............... *H04W 4/021* (2013.01); *G06Q 50/30* (2013.01); *G08G 1/0141* (2013.01); *G07B 15/06* (2013.01); *G06Q 30/0201* (2013.01); *G08G 1/0112* (2013.01); *G06F 17/30943* (2013.01); *H04W 4/028* (2013.01)
USPC ............................... 707/757; 701/408; 726/26

(58) Field of Classification Search
CPC .................. G06F 21/6254; G06F 17/30943
USPC ................................................. 707/918–921
See application file for complete search history.

(56) References Cited

U.S. PATENT DOCUMENTS 7,676,680 B2* 3/2010 Seelos et al. ................... 713/179
2001/0036224 A1* 11/2001 Demello et al. .............. 375/220
(Continued)

FOREIGN PATENT DOCUMENTS

JP H11345388 12/1999
JP 2003228798 8/2003
(Continued)

OTHER PUBLICATIONS

Gkoulalas-Divanis, Aris et al., Providing K-Anonymity in Location Based Services, ACM SIGKDD Explorations Newsletter, vol. 12, Issue 1, Jun. 2010.*
(Continued)

*Primary Examiner* — Usmaan Saeed
*Assistant Examiner* — Brittany N Allen
(74) *Attorney, Agent, or Firm* — Scully, Scott, Murphy & Presser, P.C.; Jennifer Davis, Esq.

(57) ABSTRACT

A method and system for controlling disclosure of trace data related to moving object. The method includes the steps of: receiving, for at least one moving object in a first region, a first record aggregate; receiving, for at least one moving object in a second region, a second record aggregate; calculating trace data from at least one attribute value of a first identifier that is in received first and second record aggregates in response to data search request; calculating to satisfy a condition of the moving object passing through at least one region and to satisfy another condition of at least two of the moving objects being present in each of the region; and returning calculated trace data as a search result if the moving object moves in calculated ranges and if the moving object has the first identifier that is in both the received first and second record aggregates.

27 Claims, 15 Drawing Sheets

(51) Int. Cl.
*G08G 1/01* (2006.01)
*G07B 15/06* (2011.01)
*G06Q 30/02* (2012.01)
*G06F 15/16* (2006.01)

(56) References Cited

U.S. PATENT DOCUMENTS

| | | |
|---|---|---|
| 2002/0169793 A1* | 11/2002 | Sweeney ................ 707/204 |
| 2006/0022048 A1* | 2/2006 | Johnson ................ 235/462.1 |
| 2009/0088962 A1* | 4/2009 | Jones ................ 701/200 |
| 2010/0024042 A1* | 1/2010 | Motahari et al. ............ 726/26 |
| 2010/0064373 A1* | 3/2010 | Cai et al. ................ 726/26 |
| 2010/0332537 A1 | 12/2010 | El Emam et al. |
| 2012/0041672 A1* | 2/2012 | Curtis et al. ............ 701/426 |

FOREIGN PATENT DOCUMENTS

| | | |
|---|---|---|
| JP | 2005-99944 A | 4/2005 |
| JP | 2007-219635 A | 8/2007 |
| JP | 2007-219636 A | 8/2007 |
| JP | 2009-278632 A | 11/2009 |
| JP | 2010182053 | 8/2010 |

OTHER PUBLICATIONS

Xu, T.; Ying Cai; , "Exploring Historical Location Data for Anonymity Preservation in Location-Based Services," INFOCOM 2008. The 27th Conference on Computer Communications. IEEE, vol., No., pp. 547-555, Apr. 13-18, 2008.

Gruteser, et al. "Anonymous Usage of Location-Based Services Through Spatial and Temporal Cloaking," In Proceedings of the 1st international conference on Mobile systems, applications and services (MobiSys '03). ACM, New York, NY, USA, 31-42 (2003).

Kashima "Chapter 16: Private Data Analysis via Output Perturbation in Aggarwal & Yu (Eds.): Privacy-preserving Data Mining", The University of Tokyo, Depatment of Mathematical Informatics, 2007.

* cited by examiner

RECORD AGGREGATE 1 — 501

| | IDENTIFIER OF MOVING OBJECT | TIME t | POSITION p | ATTRIBUTE 1 (COLOR) | ATTRIBUTE 2 (VEHICLE TYPE) | ATTRIBUTE 3 (VEHICLE SPEED) | ATTRIBUTE 4 (DRIVER) | ATTRIBUTE 5 (...) |
|---|---|---|---|---|---|---|---|---|
| 511 | XXXXX | t1 | p1 | RED | CARGO TRUCK | 45 | MALE IN TWENTIES | ... |
| 512 | YYYYY | t2 | p2 | BROWN | TRUCK | 55 | MALE IN FIFTIES | ... |
| 513 | ZZZZZ | t3 | p3 | WHITE | SEDAN | 50 | FEMALE IN THIRTIES | ... |
| | ... | ... | ... | ... | ... | ... | ... | ... |

INTEGRATED RECORD AGGREGATE A — 502

| | IDENTIFIER OF MOVING OBJECT | TIME t | POSITION p | ATTRIBUTE 1 (COLOR) | ATTRIBUTE 2 (VEHICLE TYPE) | ATTRIBUTE 3 (VEHICLE SPEED) | ATTRIBUTE 4 (DRIVER) | ATTRIBUTE 5 (...) |
|---|---|---|---|---|---|---|---|---|
| 521 | XXXXX | t1 | p1 | RED | CARGO TRUCK | 45 | MALE IN TWENTIES | ... |
| 522 | XXXXX | t4 | p4 | RED | CARGO TRUCK | 50 | MALE IN TWENTIES | ... |
| 523 | YYYYY | t2 | p2 | BROWN | TRUCK | 55 | MALE IN FIFTIES | ... |
| 524 | YYYYY | t5 | p5 | BROWN | TRUCK | 55 | MALE IN FIFTIES | ... |
| 525 | ZZZZZ | t3 | p3 | WHITE | SEDAN | 50 | FEMALE IN THIRTIES | ... |
| 526 | ZZZZZ | t6 | p6 | WHITE | SEDAN | 60 | FEMALE IN THIRTIES | ... |
| | ... | ... | ... | ... | ... | ... | ... | ... |

FIG. 5

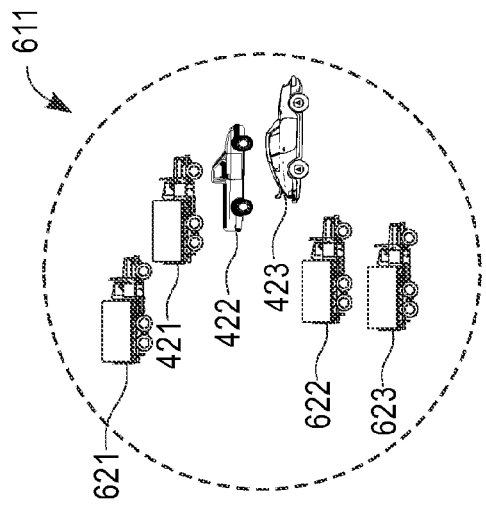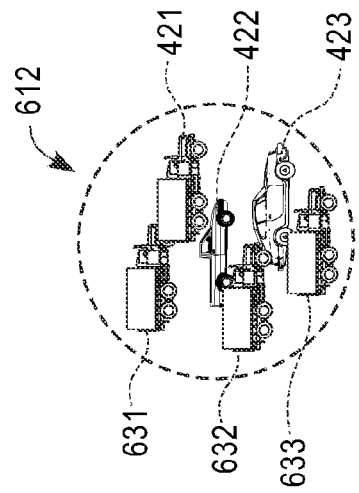
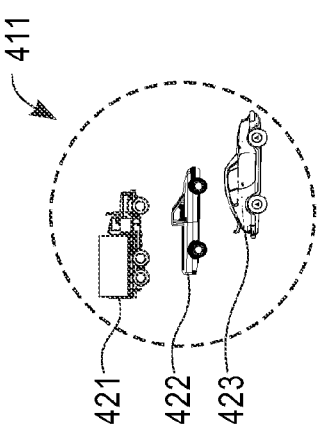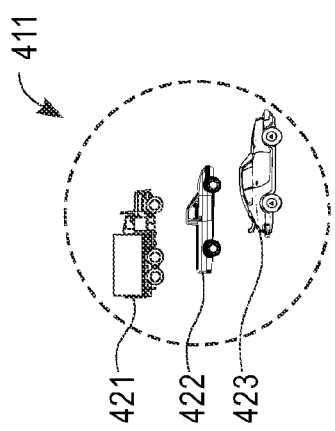
FIG. 6A  FIG. 6B

701

| IDENTIFIER OF MOVING OBJECT | TIME t | POSITION p | ATTRIBUTE 1 (COLOR) | ATTRIBUTE 2 (VEHICLE TYPE) | ATTRIBUTE 3 (VEHICLE SPEED) | ATTRIBUTE 4 (DRIVER) | ATTRIBUTE 5 (...) |
|---|---|---|---|---|---|---|---|
| XXXXX | t1 | p1 | RED | CARGO TRUCK | 45 | MALE IN TWENTIES | ... |
| YYYYY | t2 | p2 | BROWN | TRUCK | 55 | MALE IN FIFTIES | ... |
| ZZZZZ | t3 | p3 | WHITE | SEDAN | 50 | FEMALE IN THIRTIES | ... |
| AAAAA | t4 | p4 | RED | CARGO TRUCK | 45 | MAIN IN TWENTIES | ... |
| BBBBB | t5 | p5 | WHITE | CARGO TRUCK | 45 | MALE IN TWENTIES | ... |

721, 722, 723, 724, 725

702

| IDENTIFIER OF MOVING OBJECT | TIME t | POSITION p | ATTRIBUTE 1 (COLOR) | ATTRIBUTE 2 (VEHICLE TYPE) | ATTRIBUTE 3 (VEHICLE SPEED) | ATTRIBUTE 4 (DRIVER) | ATTRIBUTE 5 (...) |
|---|---|---|---|---|---|---|---|
| XXXXX | t1 | p1 | #ff0000 | 1 | 45 | 20, 1 | ... |
| YYYYY | t2 | p2 | #800000 | 2 | 55 | 50, 1 | ... |
| ZZZZZ | t3 | p3 | #ffffff | 3 | 50 | 30, 2 | ... |
| AAAAA | t4 | p4 | #ff0000 | 1 | 45 | 20, 1 | ... |
| BBBBB | t5 | p5 | #ffffff | 1 | 45 | 20, 1 | ... |

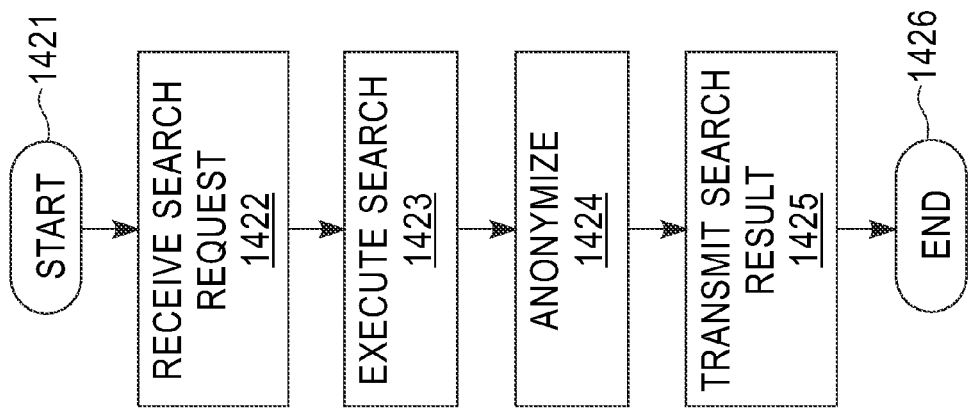
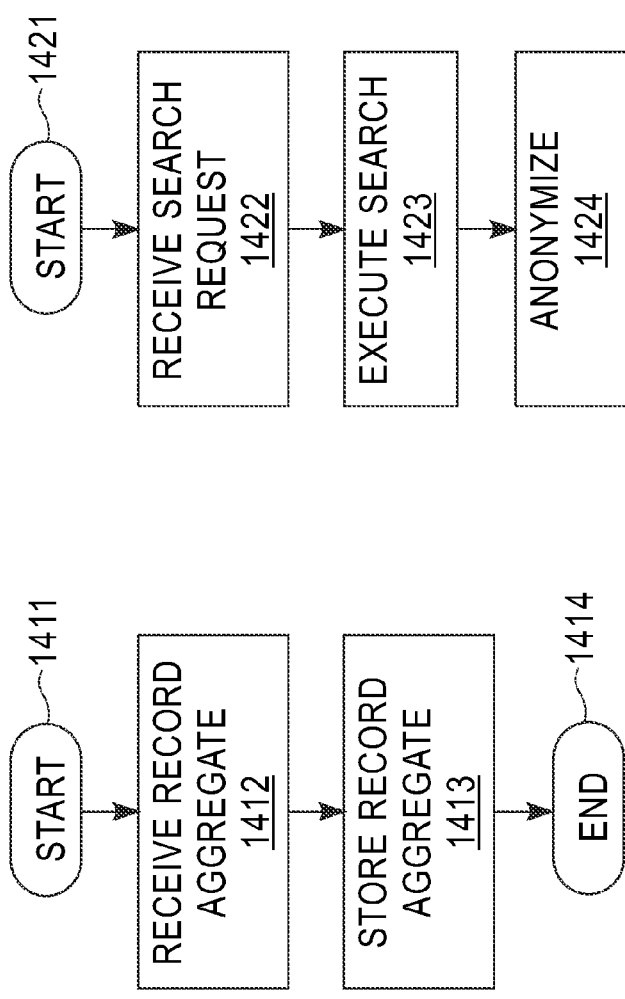
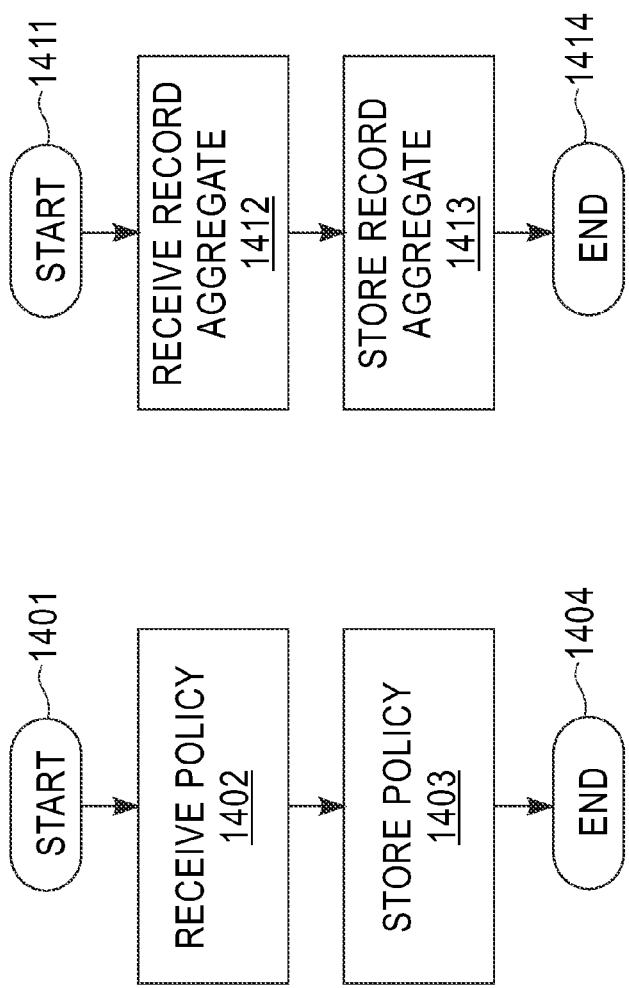

CONTROLLING DISCLOSURE OF TRACE DATA RELATED TO MOVING OBJECT

CROSS-REFERENCE TO RELATED APPLICATION

This application claims priority under 35 U.S.C. §119 from Japanese Patent Application No. 2011-018948 filed Jan. 31, 2011, the entire contents of which are incorporated herein by reference.

BACKGROUND OF THE INVENTION

1. Field of the Invention

The present invention relates to techniques for controlling disclosure of trace data related to a moving object. More particularly, the present invention relates to a technique enabling a server computer connected to data provider systems to control disclosure of trace data related to a moving object.

2. Description of Related Art

In vehicle-to-any (V2X) (including vehicle-to-vehicle (V2V), vehicle-to-roadside (V2R), and vehicle-to-infrastructure (V2I)) communication systems, a data aggregator system is responsible for aggregating data into records, where each data provider system collects such data from vehicles or people. The data aggregator system is also responsible for providing the aggregated data to service provider systems. Entities who own the rights of the collected data can be owners of the vehicles, drivers of the vehicles, or managers who are associated with the vehicles. The collected data and the aggregated records can be used for identifying individuals, behaviors of the individuals, or interests of the individuals. Accordingly, to protect personal information, the data aggregator system has to be controlled in a way that the collected data or the aggregated records are selectively disclosed to the service provider systems under appropriate management.

Xu, T.; Ying Cai; "Exploring Historical Location Data for Anonymity Preservation in Location-Based Services," INFOCOM 2008. The 27th Conference on Computer Communications, IEEE, vol., no., pp. 547-555, 13-18 Apr. 2008 discloses a location information that is depersonalized by ensuring that each location reported for location-based services (LBS) is a cloaking area containing K different footprints (i.e., historical locations of different mobile nodes). Therefore, Xu provides that the exact identity and location of a service requestor remain anonymous from LBS service providers (Abstract).

Gruteser, et al. "Anonymous Usage of Location-Based Services Through Spatial and Temporal Cloaking," In Proceedings of the 1st international conference on Mobile systems, applications and services (MobiSys '03). ACM, New York, N.Y., USA, 31-42 (2003) discloses a middleware architecture and algorithms that can be used by a centralized location broker service, and further discloses that the adaptive algorithms adjust the resolution of location information along spatial or temporal dimensions in order to meet anonymity constraints that are specified on the basis of the entities who can be using location services within a given area (Abstract).

Kashima "Chapter 16: Private Data Analysis via Output Perturbation in Aggarwal & Yu (Eds.): Privacy-preserving Data Mining", The University of Tokyo, Department of Mathematical Informatics, 2007 describes preservation of data privacy via output perturbation and introduction of the concept of differential privacy thereof.

Japanese Unexamined Patent Application Publication No. 2007-219636 describes a data disclosure method carried out by a data disclosure apparatus that manages data including privacy information. In the data disclosure method, the data disclosure apparatus holds one or more pieces of data, each of which is composed of one or more attributes, calculates an anonymity level to be preserved if a specific attribute of the data is disclosed, changes the granularity of the data of the specific attribute if the calculated anonymity level does not reach a desired anonymity level, and discloses the data of the specific attribute so that the anonymity level higher than or equal to the desired threshold is maintained (Claim 1).

Japanese Unexamined Patent Application Publication No. 2007-219635 describes an information anonymizing method carried out by a personal-information operations management apparatus that manages information operations (Claim 1). The method includes the steps of: (1) storing each information as one or more pairs of an attribute and an attribute value; (2) statistically calculating an anonymity level that indicates how easily an attribute value of an attribute to be kept anonymous is identified in response to disclosure of the attribute; (3) selecting an attribute having the anonymity level that is higher than a preset anonymity threshold; and (4) disclosing the selected attribute and an attribute value of the selected attribute (Claim 1).

Japanese Unexamined Patent Application Publication No. 2009-278632 describes a method of diluting precise location information of a target device. The method includes the steps of: converting a measured latitude arc value of the precise location into a linear distance; rounding the linear distance having a predetermined linear precision to an adjusted linear distance value; converting the adjusted linear distance value into an adjusted latitude arc value; determining a measured longitude linear distance corresponding to the adjusted latitude arc value; rounding the measured longitude linear distance having a second predetermined linear precision to an adjusted measured longitude linear distance; converting the adjusted measured longitude linear distance into an adjusted longitude arc value; and transmitting the adjusted latitude arc value and the adjusted longitude arc value to a requesting entity (Paragraph 0008).

Japanese Unexamined Patent Application Publication No. 2005-99944 provides, when various services are provided to those who use privacy information, a privacy-information protection method that includes the steps of: (1) managing the privacy information and a privacy preference as a privacy capsule in an integrated fashion, where the privacy preference defines a condition for disclosing the privacy information to outside; (2) comparing a privacy policy with the corresponding privacy preference, where the privacy preference defines a usage condition for a user of the privacy information; (3) permitting the use of the privacy information within the privacy capsule if the privacy policy satisfies the condition of the privacy preference; and (4) preventing leakage of the privacy information to outside of the privacy capsule, whereby the privacy information is concealed from outside of the privacy capsule (Claim 1).

SUMMARY OF THE INVENTION

Accordingly, one aspect of the present invention provides a method of a server computer connected to at least one data provider system to control disclosure of data provided from the at least one data provider system, the method including the steps of: receiving, for at least one moving object in a first spatio-temporal region, a first record aggregate from at least one data provider system, the first record aggregate including, as a unit record, a first identifier for identifying a first recorded moving object and at least one attribute value associated with the first identifier; receiving, for at least one moving object in a second spatio-temporal region, a second record aggregate from the at least one data provider system, the second record aggregate including, as a unit record, a second identifier for identifying a second recorded moving object and at least one attribute value associated with the second identifier, the second identifier including at least one of the first identifier; calculating trace data from the at least one attribute value associated with the first identifier that is present in both received first record aggregates and received second record aggregates in response to a reception of a data search request to search for data related to a moving object, where the trace data is related to the moving object that corresponds to the data search request; calculating to satisfy a condition of the moving object passing through at least one region having certain spatio-temporal ranges within certain time ranges and to satisfy another condition of at least two of the moving objects being present in each of the at least one region, the spatio-temporal range of the at least one region, and/or a passing time range of the spatial temporal range of each of the at least one region; and returning calculated trace data or part of the trace data as a search result if the moving object moves in calculated spatio-temporal ranges within calculated passing time ranges and if the moving object has the first identifier that is present in both the received first record aggregates and the received second record aggregates, where at least one of the steps is carried out by a server computer device.

Another aspect of the present invention provides a system that controls disclosure of data provided from at least one data provider system, the system including: a first receiving module for receiving, for at least one moving object in a first spatio-temporal region, a first record aggregate from at least one data provider system, the first record aggregate including, as a unit record, a first identifier for identifying a first recorded moving object and at least one attribute value associated with the first identifier; a second receiving module for receiving, for at least one moving object in a second spatio-temporal region, a second record aggregate from the at least one data provider system, the second record aggregate including, as a unit record, a second identifier for identifying a second recorded moving object and at least one attribute value associated with the second identifier, the second identifier including at least one of the first identifier; a calculating module for calculating trace data from the at least one attribute value associated with the first identifier that is present in both received first record aggregates and received second record aggregates in response to a reception of a data search request to search for data related to a moving object, where the trace data is related to the moving object that corresponds to the data search request; an anonymizing module for calculating to satisfy a condition of the moving object passing through at least one region having certain spatio-temporal ranges within certain time ranges and to satisfy another condition of at least two of the moving objects being present in each of the at least one region, the spatio-temporal range of the at least one region, and/or a passing time range of the spatial temporal range of each of the at least one region; and a transmitting module for returning calculated trace data or part of the trace data as a search result if the moving object moves in calculated spatio-temporal ranges within calculated passing time ranges and if the moving object has the first identifier that is present in both the received first record aggregates and the received second record aggregates.

Another aspect of the present invention provides a computer readable storage medium tangibly embodying a computer readable program code having non-transitory computer readable instructions which when implemented, cause a computer to carry out the steps of a method including: receiving, for at least one moving object in a first spatio-temporal region, a first record aggregate from at least one data provider system, the first record aggregate including, as a unit record, a first identifier for identifying a first recorded moving object and at least one attribute value associated with the first identifier; receiving, for at least one moving object in a second spatio-temporal region, a second record aggregate from the at least one data provider system, the second record aggregate including, as a unit record, a second identifier for identifying a second recorded moving object and at least one attribute value associated with the second identifier, the second identifier including at least one of the first identifier; calculating trace data from the at least one attribute value associated with the first identifier that is present in both received first record aggregates and received second record aggregates in response to a reception of a data search request to search for data related to a moving object, where the trace data is related to the moving object that corresponds to the data search request; calculating to satisfy a condition of the moving object passing through at least one region having certain spatio-temporal ranges within certain time ranges and to satisfy another condition of at least two of the moving objects being present in each of the at least one region, the spatio-temporal range of the at least one region, and/or a passing time range of the spatial temporal range of each of the at least one region; and returning calculated trace data or part of the trace data as a search result if the moving object moves in calculated spatio-temporal ranges within calculated passing time ranges and if the moving object has the first identifier that is present in both the received first record aggregates and the received second record aggregates, where at least one of the steps is carried out by a server computer device.

BRIEF DESCRIPTION OF THE DRAWINGS

FIG. 5 illustrates an example of record aggregates according to an embodiment of the present invention.

FIG. 6A illustrates an increase in the number of moving objects included in an extended range $w_j$ in response to extension of a range w according to an embodiment of the present invention.

FIG. 6B illustrates an increase in the number of moving objects included in an extended or shifted time range $(s_j, e_j)$ in response to extension, or forwardly or backwardly shifting of a passing time range $(s_j, e_j)$ according to an embodiment of the present invention.

FIG. 7 shows tables illustrating conversion of attribute values into numerical values in order to determine an aggregate value, by using the attribute values of a record aggregate according to an embodiment of the present invention.

FIG. 14A is a flowchart showing a method of obtaining a policy according to an embodiment of the present invention.

FIG. 14B is a flowchart showing a method of receiving record aggregates according to an embodiment of the present invention.

FIG. 14C is a flowchart showing a method of obtaining trace data in response to reception of a data search request, processing (anonymizing) of the obtained trace data, and transmission of the processed result as a search result according to an embodiment of the present invention.

DETAILED DESCRIPTION OF THE PREFERRED EMBODIMENTS

Figure 1:
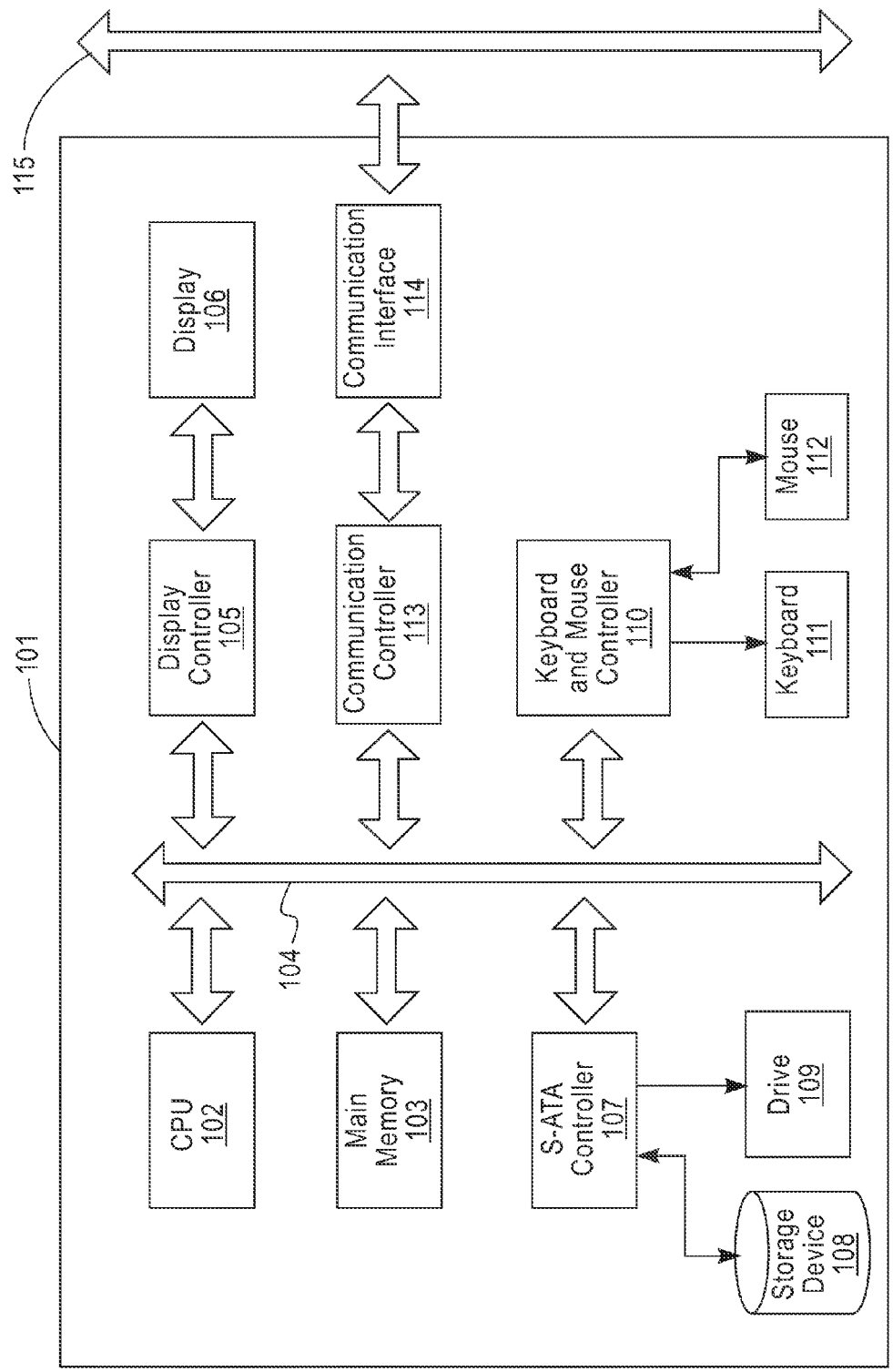
FIG. 1 is a basic block diagram of computer hardware according to an embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Trace data that is derived from record data collected from a V2X communication system includes personal information about the location, time, and behavior of a vehicle and/or person. For example, the personal information can produce a great value in the markets and policies, where the personal information can be used for analyzing behaviors of consumers or willingness to purchase of consumers or for analyzing an environment of moving objects (e.g., a traffic environment). Furthermore, the trace data are easily associated with (or linked to) various behavioral information such as an object's temporal and spatial behavior. Methods for anonymizing location information of vehicles or persons are known, but these methods are incapable of protecting privacy of the vehicles or persons, because data providers can identify their behaviors from the trace data. As a result, problems regarding protection of personal information are likely to occur. Accordingly, a technique for disclosing trace data only when a certain condition is satisfied is needed in order to avoid the problems related to the protection of personal information.

The present invention provides a method of controlling disclosure of trace data related to a moving object, a computer, and a computer program for the same.

In particular, the present invention provides a method of a server computer connected to at least one data provider system to control disclosure of data provided from the at least one data provider system. The method includes the steps, executed by the server computer, of:

receiving, for one or more moving objects in a first spatio-temporal region, a first record aggregate from at least one data provider system, the first record aggregate containing, as a unit record, an identifier for identifying one moving object and at least one attribute value associated with the identifier;

receiving, for one or more moving objects in a second spatio-temporal region, a second record aggregate from the at least one data provider system, the second record aggregate containing, as a unit record, an identifier for identifying one moving object and at least one attribute value associated with the identifier, identifiers of moving objects contained in the second record aggregate including at least one identifier that is the same as an identifier of a moving object contained in the first record aggregate;

calculating, in response to reception of a data search request to search for data related to a moving object, trace data related to the moving object that corresponds to the data search request from attribute values associated with the same identifier in the received first and second record aggregates;

calculating so that the condition that a moving object passes through L regions that have certain ranges within certain time ranges is satisfied and so that k or more moving objects (k is an integer greater than or equal to 2) are present in each of the L regions, a range $w_j$ and/or a passing time range $(s_j, e_j)$ for the range $w_j$ (j is an integer of 1, 2, ..., L) for each of the L regions; and returning, in accordance with the fact that the moving object having the same identifier in the received first and second record aggregates moves in the calculated ranges $w_j$ within the calculated passing time ranges $(s_j, e_j)$, the calculated trace data or part of the trace data as a search result.

In one embodiment of the present invention, the step of returning can include the step of restricting disclosure of the calculated trace data or part of the trace data in accordance with a policy associated with the same identifier contained in the received first and second record aggregates. Additionally, in one embodiment of the present invention, the policy associated with the same identifier can include constraint data regarding the number of times of disclosure of the trace data related to the moving object having the same identifier or a destination of disclosure of the trace data, and the step of returning can include the step of restricting disclosure of the calculated trace data related to the moving object that corresponds to the data search request or part of the trace data in accordance with the constraint data regarding the number of times of disclosure or the destination of disclosure.

In one embodiment of the present invention, the step of returning can include the steps of:

controlling, when a first moving object is in a calculated range $w_j$ within a calculated passing time range $(s_j, e_j)$ and a second moving object is in the calculated range $w_j$ within the calculated passing time range $(s_j, e_j)$, by replacing a first value that is calculated from at least one attribute value (first attribute value) associated with an identifier of the first moving object in the received first and second record aggregates with a second value that is calculated from at least one attribute value (second attribute value) associated with an identifier of the second moving object in the received first and second record aggregates, a way of selecting the first attribute value so that an aggregate value calculated after the replacement with the second value completely matches an aggregate value calculated from the first value, the second value calculated from the second attribute value being calculated by using a method that is the same as a method with which the first value is determined from the first attribute value; and returning, in accordance with the fact that the aggregate value calculated after the replacement with the second value completely matches the aggregate value calculated from the first value as a result of the step of controlling, the calculated trace data related to the moving object that corresponds to the data search request, part of the trace data, or the controlled attribute value as a search result.

In one embodiment of the present invention, the step of returning can include the step of restricting disclosure of the calculated trace data or part of the trace data in accordance with a policy associated with the same identifier contained in the received first and second record aggregates. Additionally, in one embodiment of the present invention, the policy associated with the same identifier can include constraint data regarding the number of times of disclosure of the trace data related to the moving object having the same identifier or a destination of disclosure of the trace data, and the step of returning can include the step of restricting disclosure of the calculated trace data related to the moving object that corresponds to the data search request or part of the trace data in accordance with the constraint data regarding the number of times of disclosure or the destination of disclosure.

In one embodiment of the present invention, the step of returning can further include the step of recording, as a history, the number of times of disclosure or the destination of disclosure.

In one embodiment of the present invention, the policy can be retrieved from a policy repository. In one embodiment of the present invention, the policy can be set by a data owner associated with the moving object or the data provider system.

In one embodiment of the present invention, the method can further include the step, executed by the server computer, of storing the received first and second record aggregates in a record repository.

In one embodiment of the present invention, the step of calculating trace data can include the step of creating, in response to the data search request, trace data from the first and second record aggregates that have been stored in the record repository.

In one embodiment of the present invention, the step of calculating trace data can include the step of integrating the first and second record aggregates into one integrated record aggregate and sorting records associated with the same identifier in the integrated record aggregate in the order of time data.

In one embodiment of the present invention, when the moving object is a vehicle, the at least one attribute value can include at least one of the identifier of the vehicle, the color of the vehicle, the number of the vehicle, the type of the vehicle, a speed at time t, a value regarding a device of the vehicle, the name, age, or gender of a driver or a passenger, the number of occupants, a state inside or outside the vehicle at time t, and a state of an occupant at time t.

Furthermore, in particular, the present invention provides a computer program causing a server computer connected to at least one data provider system to control disclosure of data provided from the at least one data provider system. The computer program causes the server computer to execute individual steps of the method according to any one of the embodiments.

In particular, the present invention provides a computer that is connected to at least one data provider system and that controls disclosure of data provided from the at least one data provider system. The computer includes:

a receiving unit configured to receive, for one or more moving objects in a first spatio-temporal region, a first record aggregate from at least one data provider system, the first record aggregate containing, as a unit record, an identifier for identifying one moving object and at least one attribute value associated with the identifier, and configured to receive, for one or more moving objects in a second spatio-temporal region, a second record aggregate from at least one data provider system, the second record aggregate containing, as a unit record, an identifier for identifying one moving object and at least one attribute value associated with the identifier, identifiers of moving objects contained in the second record aggregate including at least one identifier that is the same as an identifier of a moving object contained in the first record aggregate;

a calculating unit configured to calculate, in response to reception of a data search request to search for data related to a moving object, trace data related to the moving object that corresponds to the data search request from attribute values associated with the same identifier in the received first and second record aggregates;

an anonymizing unit configured to calculate so that the condition that a moving object passes through L regions that have certain ranges within certain time ranges is satisfied and so that k or more moving objects (k is an integer greater than or equal to 2) are present in each of the L regions, a range $w_j$ and/or a passing time range $(s_j, e_j)$ for the range $w_j$ (j is an integer of $1, 2, \ldots, L$) for each of the L regions; and a transmitting unit configured to return, in accordance with the fact that the moving object having the same identifier in the received first and second record aggregates moves in the calculated ranges $w_j$ within the calculated passing time ranges $(s_j, e_j)$, the calculated trace data or part of the trace data as a search result.

Advantageous Effects of Invention

In accordance with the embodiments of the present invention, privacy of trace data is protected. This makes it possible to create, in implementation of V2X systems, the basis that permits secure utilization of the trace data.

In particular, in accordance with the embodiments of the present invention, trace data can be disclosed based on a policy set by entities who own the rights of the data (hereinafter, referred to as data owners), including owners of moving objects. This enables disclosure of the trace data based on the intentions of the data owners, and thus, makes it easier to encourage the data owners who have concerns about the privacy to provide their data.

Particularly in accordance with the embodiments of the present invention, disclosure of data can be controlled for each data aggregator system. This makes it easier to create the basis of performing access control and charge control on data users.

FIG. 1 illustrates a basic block diagram of computer hardware that can be used in an embodiment of the present invention.

A computer (101) includes a central processing unit (CPU) (102) and a main memory (103), which are connected to a bus (104). The CPU (102) is preferably based on the 32-bit or 64-bit architecture. For example, the Core i (trademark) series, the Core 2 (trademark) series, the Xeon (trademark) series, the Pentium (registered trademark of Intel Corporation) series, or the Celeron (registered trademark of Intel Corporation) series, or the Atom (trademark) series of Intel Corporation or the Phenom (trademark) series, the Athlon (trademark) series, the Turion (trademark) series, or Sempron (trademark) of AMD can be used. A display (106), e.g., a liquid crystal display (LCD), can be connected to the bus (104) via a display controller (105). The display (106) is used for displaying, for management of the computer, information on the computer connected to a network via a communication line and information on software running on the computer by using an appropriate graphic interface. A storage device (108), e.g., a hard disk or a solid state drive, and a drive (109), e.g., a CD drive, a DVD drive, or a BD drive, can be connected to the bus (104) via an S-ATA or IDE controller (107). A keyboard (111) and a mouse (112) can be further connected to the bus (104) via a keyboard/mouse controller (110) or a USB bus (not illustrated).

The storage device (108) stores an operating system (OS), a Java (registered trademark of Sun Microsystems) processing environment such as J2EE, Java (registered trademark) applications, a Java (registered trademark) virtual machine (JVM), programs providing Java (registered trademark) just-in-time (JIT) compilers, other programs, and data, in a manner that the stored materials can be loaded to the main memory (103).

The drive (109) is used for installing programs from a CD-ROM, a DVD-ROM, or a BD in the storage device (108) as needed.

A communication interface (114) supports, for example, the Ethernet (registered trademark) protocol. The communication interface (114) is connected to the bus (104) via a communication controller (113). The communication interface (114) functions to physically connect the computer (101) to a communication network (115) and provides a network interface layer of the TCP/IP communication protocol of a communication function of the OS of the computer (101). The communication network (115) can be a wired LAN environment or a wireless LAN environment based on wireless LAN connection standards, such as IEEE 802.11a/b/g/n.

Figure 2:
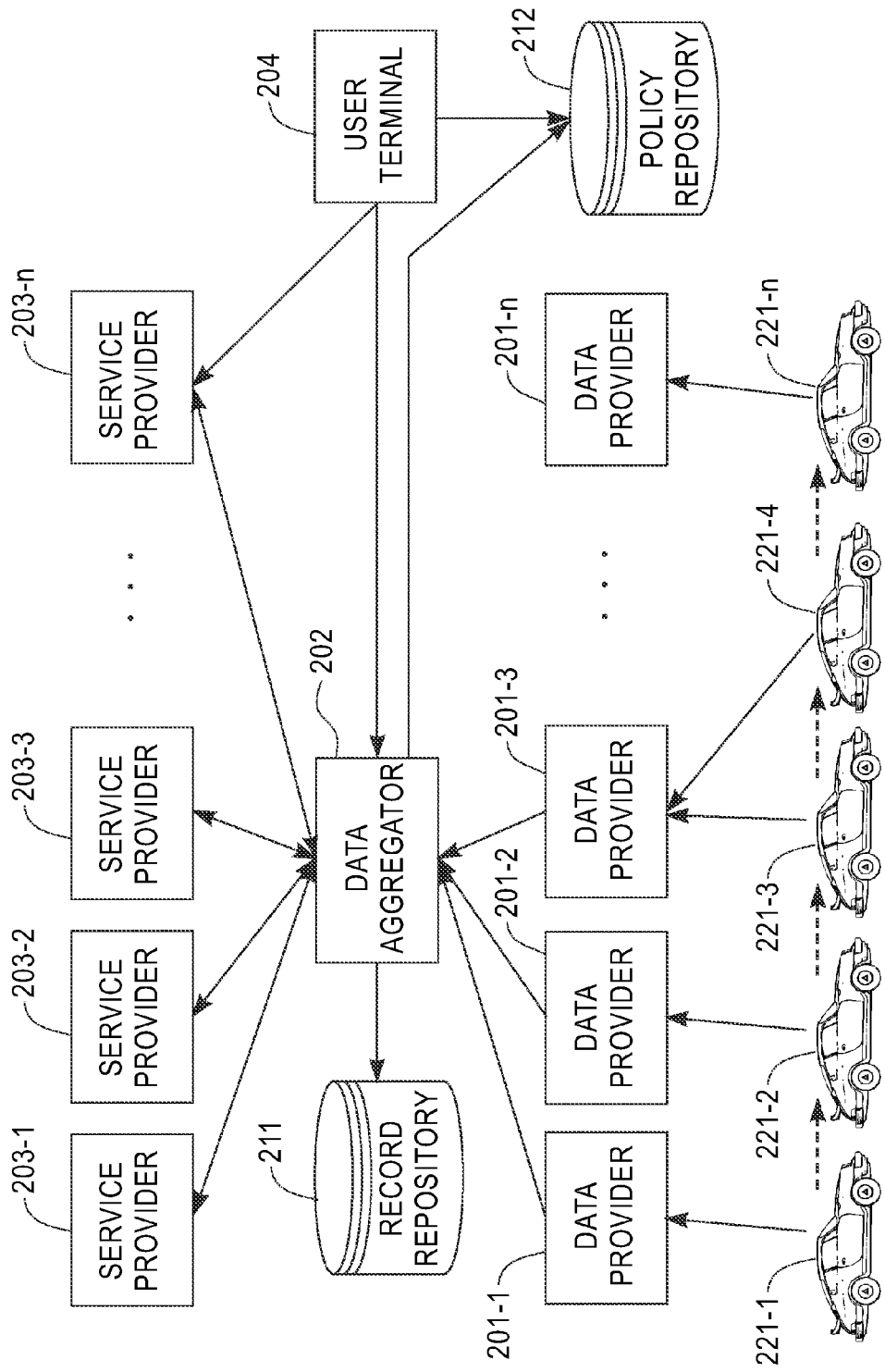
FIG. 2 illustrates data provider systems, a data aggregator computer, service provider computers, data owner server computers, and a user terminal according to an embodiment of the present invention.

FIG. 2 illustrates data provider systems (hereinafter, referred to as "data providers"), a data aggregator computer (hereinafter, referred to as "data aggregator"), service provider computers (hereinafter, referred to as "service providers"), data owner server computers (hereinafter, referred to as "data owner servers"), and a user terminal that can be used in an embodiment of the present invention.

The data providers (201-1 to 201-n, "n" is an integer) are devices capable of obtaining or receiving information regarding moving objects by communicating with the moving objects or wireless devices mounted in the moving objects. The data providers (201-1 to 201-n) are, for example, cameras/sensors, and can be, for example, cameras/sensors installed in roads. Information regarding moving objects includes spatio-temporal data, which is, for example, a record regarding a moving object that was observed at a position $p_i$ at time $t_i$ and includes attribute values of the moving object or of attributes associated with the moving object. For example, the cameras/sensors can detect or determine information regarding a moving object. When the moving object is a vehicle, the information can be, for example, an identifier of the vehicle, the color of the vehicle, the number of the vehicle, the type of the vehicle, a speed at time t (vehicle speed), a value regarding a device of the vehicle, the name, age, or gender of a driver or a passenger, the number of occupants, or a place (e.g., facility) at which the moving object has stopped by. The identifier of the vehicle can be, for example, the vehicle identification number (VIN) or the vehicle number. In the case of ISO 3779, (1) the first three digits of the VIN represent a world manufacturer identifier (WMI), (2) the fourth to ninth digits thereof represent a vehicle descriptor section (VDS), and (3) the last eight digits thereof represent a vehicle identifier section (VIS). Alternatively, the identifier can be a symbol, a character, a numeral written on a license plate of the vehicle, or a combinations thereof, or can be the number written on the vehicle (e.g., the number identifying each car of a train). The cameras/sensors can record images or movies of moving objects. The data providers (201-1 to 201-n) associate the detected information with an identifier that is unique to a moving object, and records the information as a record. The identifier can be used for identifying a moving object. The identifier can also be used for identifying a plurality of records of the same moving object. A record is unit data that includes an identifier that is unique to a moving object, time t, and a position p, and other attribute values. The other attribute values include not only attribute values unique to the moving object but also attribute values detected at the position p and the time t. For example, when the moving object is a vehicle, the other attribute value can be, for example, the color of the vehicle, the vehicle number, the type of the vehicle, a speed (vehicle speed) at time t, a value regarding a device of the vehicle, the name, age, or gender of a driver or a passenger, the number of occupants, or a place (e.g., facility) at which the moving object has stopped by. When the data providers (201-1 to 201-n) detect information regarding a plurality of moving objects (i.e., having different identifiers), the data providers (201-1 to 201-n) can generate records regarding the individual moving objects, and can integrate the plurality of generated records into a record aggregate (see FIG. 5).

Also, the data providers (201-1 to 201-n) can be terminals capable of receiving records transmitted from moving objects (221-1 to 221-n). The records can be the same as the aforementioned ones. The records can be provided to a data aggregator (202) from the data providers (201-1 to 201-n) in response to record transmission requests transmitted from the data providers (201-1 to 201-n) or automatically (e.g., at predetermined time intervals). Communication between the data providers (201-1 to 201-n) and the moving objects (221-1 to 221-n) can be performed, for example, based on vehicle-to-any (V2X) (including vehicle-to-roadside (V2R) and vehicle-to-infrastructure (V2I)) communication systems.

For example, the data provider (201-1) can detect information regarding moving objects that are moving in a certain range within a certain time range (also referred to as a "spatio-temporal region") or can receive records from moving objects that are moving in the certain range within the certain time range. In addition, a predetermined range covered by the data provider (201-1) can overlap a predetermined range covered by the data provider (201-2) that is different from the data provider (201-1).

The data providers (201-1 to 201-n) can be connected to the data aggregator (202) via a wired or wireless network. In an embodiment of the present invention, at least one data provider can be used.

The data aggregator (202) receives the records or records aggregates from the data providers (201-1 to 201-n). The records or record aggregates can be transmitted to data aggregator (202) from the data providers (201-1 to 201-n) in response to record transmission requests transmitted from the data providers (201-1 to 201-n) or automatically (e.g., at predetermined time intervals). The data aggregator (202) can store, in a record repository (211) that is accessible from the data aggregator (202), the records or record aggregates provided from the data providers (201-1 to 201-n) or integrated record aggregates into which a plurality of record aggregates are further integrated (hereinafter, it should be understood that "record aggregates" mentioned in this specification include records, record aggregates, and integrated record aggregates and the same applies to the attached claims).

In response to a data search request received from at least one of service providers (203-1 to 203-n), the data aggregator (202) obtains record aggregates from the record repository (211). Then, the data aggregator (202) can determine trace data related to a moving object that corresponds to the data search request from individual attribute values associated with the same identifier in the record aggregates.

The data aggregator (202) calculates so that the condition that a moving object associated with a record to be disclosed in response to the data search request passes through L regions that have certain ranges within certain time ranges (L is an integer greater than or equal to 1) is satisfied and so that k or more moving objects (k is an integer greater than or equal to 2) are present in each of the L regions, a range $w_j$ and/or a passing time range ($s_j$, $e_j$) for the range $w_j$ for each of the L regions. "s" represents start time, "e" represents "end time", and "j" represents an integer of "1, 2, . . . , L". In accordance with the fact that a moving object having the same identifier in one or more record aggregates is moving in the calculated range $w_j$ within the calculated passing time range ($s_j$, $e_j$), the data aggregator (202) returns, to the service provider that has transmitted the data search request, the requested data that has been calculated or part of the data as a search result. The data aggregator (202) can restrict disclosure of the requested data or part of the data in accordance with a policy retrieved from a policy repository (212). The policy can be a policy that has been created by a data owner of data used for creating the search result. The data owner includes an owner or a manager of the moving object, or an entity or a system that has been authorized to manage the data by the owner or the manager of the moving object.

If a first moving object is in the calculated range $w_j$ within the calculated passing time range ($s_j$, $e_j$) and a second moving object is also in the calculated range $w_j$ within the calculated passing time range ($s_j$, $e_j$), the data aggregator (202) replaces a first value calculated from at least one attribute value (first attribute value) associated with an identifier of the first moving object in record aggregates with a second value calculated from at least one attribute value (second attribute value) associated with an identifier of the second moving object in the record aggregates, thereby being able to control a way of selecting the first attribute value so that an aggregate value calculated after the replacement with the second value completely matches an aggregate value calculated from the first value. The second value calculated from the second attribute value is calculated using a method that is the same as a method with which the first value is determined from the first attribute value (more specifically, using the same attributes). The data aggregator (202) controls the way of selecting the first attribute value in the aforementioned manner and returns, in accordance with the fact that the aggregate value calculated after the replacement with the second value completely matches the aggregate value calculated from the first value, the requested data, part of the data, or the controlled attribute value as a search result, to the service provider that has transmitted the data search request. The data aggregator (202) can restrict disclosure of the requested data or part of the data in accordance with a policy retrieved from the policy repository (212). The policy can be a policy that has been created by a data owner of data used for creating the search result.

The data aggregator (202) can be connected to the service providers (203-1 to 203-n), the record repository (211), and the policy repository (212) via a wired or wireless network. The data aggregator (202) can be constituted by one or more computers, or can be a server, e.g., an enterprise server. The data aggregator (202) can be a server in its relation with the data providers (201-1 to 201-n) or the service providers (203-1 to 203-n).

The data aggregator (202) receives, from a data owner of data regarding a moving object, a policy for restricting disclosure of the data regarding the moving object of the data owner. The data aggregator (202) stores the policy in the policy repository (212) that is accessible from the data aggregator (202). Additionally, the data owner can set or change the policy via a user terminal (204).

The service providers (203-1 to 203-n) request the data aggregator (202) to search for data (i.e., data regarding a moving object and data determined from the data) provided from the data providers (201-1 to 201-n). The service providers (203-1 to 203-n) can request to search for data in accordance with, for example, the SQL standard. A data search requestor (also referred to as a requestor) can request to search for data provided from the data providers (201-1 to 201-n) via the service providers (203-1 to 203-n) or via the user terminal (204) connected to the service providers (203-1 to 203-n). The data search requestor can enter a condition regarding data to be requested or a conditional expression via, for example, a graphical user interface (GUI).

The user terminal (204) can be used by data owner to set or change the policy. The user terminal (204) can also be used by data search requestor to request for data regarding a moving object. The user terminal used by the data owner and the user terminal used by the data search requestor are not necessarily the same.

The user terminal (204) can be connected to the data aggregator (202) via a wired or wireless network.

Examples of the user terminal (204) include a computer, a personal digital assistant, a mobile phone, a smartphone, and a game machine.

The moving objects (221-1 to 221-n) are, for example, vehicles. When being classified based on, for example, types of industry, types of the vehicles include construction vehicles, agricultural vehicles, industrial vehicles, railway vehicles, and military vehicles. The types of the vehicles further include, for example, automobiles, motorcycles, light cars, and trolleybuses recited in the Japanese road traffic law. The moving objects (221-1 to 221-n) can also be aircrafts. Additionally, the moving objects (221-1 to 221-n) can be humans or animals of other kinds.

Each of the moving objects (221-1 to 221-n) has an identifier for uniquely identifying the moving object. The identifier can be used for identifying the moving object. The identifier can also be used for identifying a plurality of records regarding the same moving object. When the moving object is a vehicle, the identifier can be, for example, the VIN, a symbol, a character, or a numeral written on a license plate or a combination thereof, or the number written on the vehicle. When the moving object is a human or an animal of other kind, the identifier can be an identifier that is unique to an electronic device (e.g., a watch or an armlet) attached to the human or the animal.

The present invention is applicable to various moving objects, and can be used for restricting disclosure of trace data related to the moving objects in various situations. For example, the present invention can be applied to management of vehicles or humans (serving as moving objects) in transfer or transport or at parking lots, management of vehicles or humans (serving as moving objects) at worksites, or management of humans (serving as moving objects) in buildings so that personal information is to be protected when necessary trace data is obtained.

Figure 3:
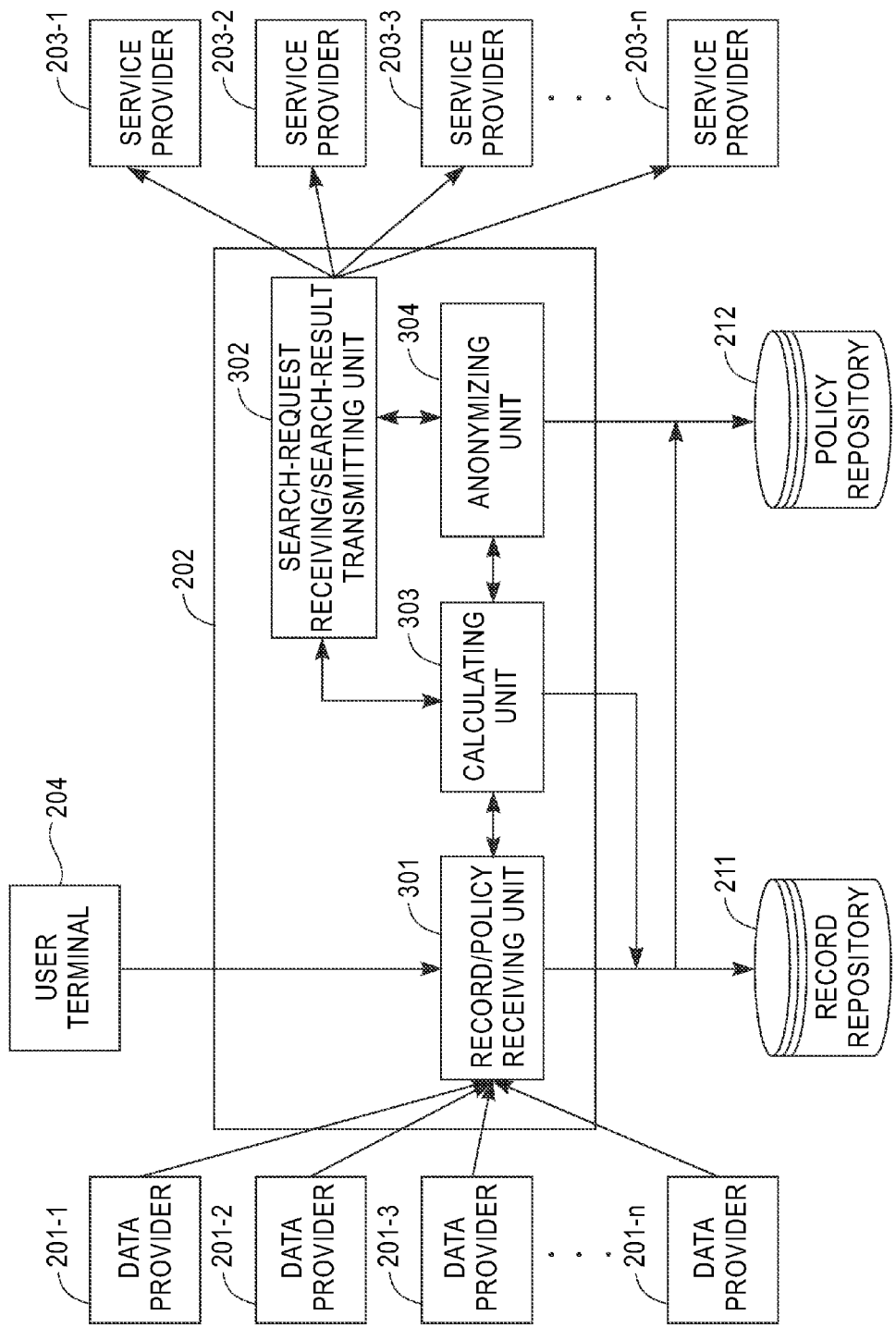
FIG. 3 illustrates a functional block diagram of a data aggregator computer having computer hardware functions according to an embodiment of the present invention.

FIG. 3 is a functional block diagram of the data aggregator (202) that has the computer hardware functions illustrated in FIG. 1 and that can be used in an embodiment of the present invention.

The data aggregator (202) includes a record/policy receiving unit (301), a search-request receiving/search-result transmitting unit (302), a calculating unit (303), and an anonymizing unit (304).

The record/policy receiving unit (301) receives record aggregates from at least one of the data providers (201-1 to 201-n) and stores the received record aggregates in the record repository (211). The record/policy receiving unit (301) can receive different record aggregates (e.g., a first record aggregate and a second record aggregate) from different data providers or can receive different record aggregates (e.g., the first record aggregate and the second record aggregate) from a single data provider.

Additionally, the record/policy receiving unit (301) receives a policy from the user terminal (204) and stores the received policy in the policy repository (212). The user terminal (204) is associated with a data owner of a moving object.

The search-request receiving/search-result transmitting unit (302) receives a data search request to search for data related to a moving object from at least one of the service providers (203-1 to 203-n). The search-request receiving/search-result transmitting unit (302) provides the received data search request to the calculating unit (303). The search-request receiving/search-result transmitting unit (302) also transmits a search result provided from the anonymizing unit (304) to the service provider (203-1 to 203-n) that has transmitted the data search request.

The calculating unit (303) receives the data search request to search for data related to a moving object from the search-request receiving/search-result transmitting unit (302). In response to reception of the data research request, the calculating unit (303) analyzes the syntax of the data search request and obtains record aggregates required by the data search request from the record repository (211) in accordance with a result of the syntax analysis. The calculating unit (303) calculates trace data related to the moving object that corresponds to the data search request, from attribute values associated with the same identifier in the first record aggregate and the second record aggregate, for example.

The calculating unit (303) calculates so that the condition that a moving object associated with a record to be disclosed in response to the data search request passes through L regions that have certain ranges within certain time ranges (L is an integer greater than or equal to 1) is satisfied and so that k or more moving objects (k is an integer greater than or equal to 2) are present in each of the L regions, a range $w_j$ and/or a passing time range $(s_j, e_j)$ for the range $w_j$ for each of the L regions. The calculating unit (303) provides the calculation result to the anonymizing unit (304). In accordance with the fact that the moving object having the same identifier in one or more record aggregates is moving in the calculated ranges $w_j$ within the calculated passing time ranges $(s_j, e_j)$, the anonymizing unit (304) provides the search-request receiving/search-result transmitting unit (302) with the calculated trace data or part of the trace data. In this specification, the aforementioned process performed by the anonymizing unit (304) is referred to as "anonymization". The search-request receiving/search-result transmitting unit (302) returns the search result to the service provider that has transmitted the data search request. The anonymizing unit (304) is also capable of restricting disclosure of the calculated trace data or part of the trace data in accordance with a policy retrieved from the policy repository (212). The policy can be a policy associated with the moving object having the same identifier in the one or more record aggregates.

If a first moving object is in a calculated range $w_j$ within a calculated passing time range $(s_j, e_j)$ and a second moving object is in the calculated range $w_j$ within the calculated passing time range $(s_j, e_j)$, the anonymizing unit (304) replaces a first value calculated from at least one attribute value (first attribute value) associated with an identifier of the first moving object contained in one or more record aggregates by a second value calculated from at least one attribute value (second attribute value) associated with an identifier of the second moving object contained in the one or more record aggregates, thereby controlling a way of selecting the first attribute value so that an aggregate value calculated after the replacement with the second value completely matches an aggregate value calculated from the first value. The second value calculated from the second attribute value is calculated using a method that is the same as the method with which the first value is determined from the first attribute value. In accordance with the fact that the aggregate value calculated after the replacement with the second value completely matches the aggregate value calculated from the first value as a result of the control, the anonymizing unit (304) provides the search-request receiving/search-result transmitting unit (302) with the calculated trace data related to the moving object that corresponds to the data search request, part of the trace data, or the controlled attribute value as a search result. In this specification, the above process performed by the anonymizing unit (304) is also referred to as "anonymization". The search-request receiving/search-result transmitting unit (302) returns the search result to the service provider that has transmitted the data search request. The anonymizing unit (304) also restricts disclosure of the calculated trace data or part of the trace data in accordance with a policy associated with the same identifier contained in the one or more record aggregates. The policy can be a policy associated with the moving object having the same identifier in the one or more record aggregates.

Figure 4:
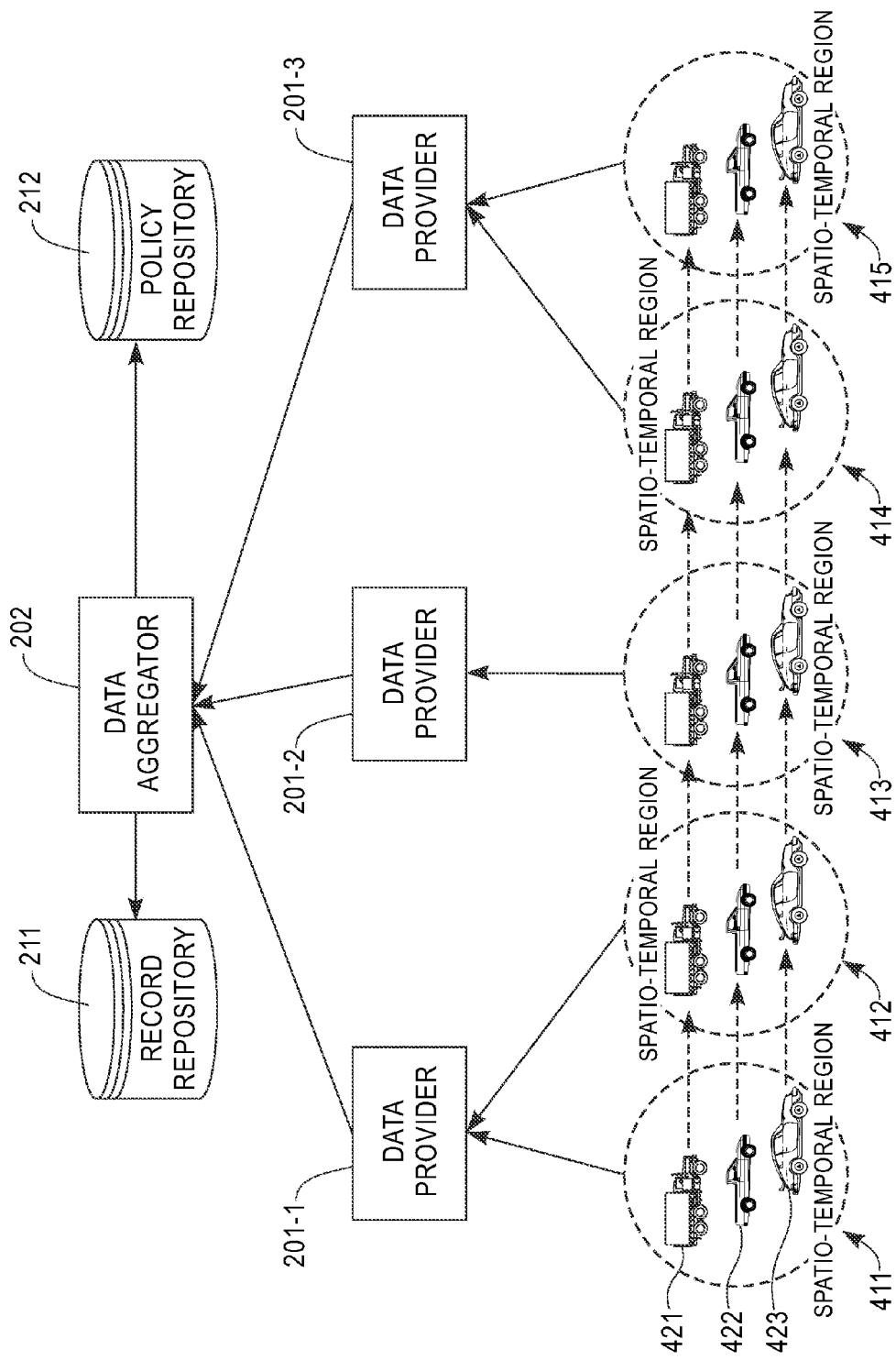
FIG. 4 illustrates how a data provider system that records moving objects as record aggregates in an embodiment of the present invention.

FIG. 4 illustrates how the data providers (201-1 to 201-3) that can be used in an embodiment of the present invention collect information regarding moving objects (421 to 423) and record the information as a record aggregate or receive and record the record aggregate transmitted from the moving objects.

The data provider (201-1) receives information from moving objects located in spatio-temporal regions (411 and 412). The data provider (201-2) receives information from moving objects located in a spatio-temporal region (413). The data provider (201-3) receives information from moving objects located in spatio-temporal regions (414 and 415).

Suppose that the spatio-temporal regions (411, 412, 413, 414, and 415) are, for example, Tokyo, Ginza, Shinagawa, Shinjuku, and Ikebukuro, respectively. It is also assumed that time ranges of the spatio-temporal regions (411, 412, 413, 414, and 415) are 9:00 to 11:00, 11:00 to 13:00, 13:00 to 15:00, 15:00 to 17:00, and 17:00 to 19:00, respectively.

It is assumed that a male in his twenties is driving the moving object (421), the identifier of which is "XXXXX", the color of which is "red", and the type of which is a cargo truck. It is also assumed that the moving object (421) runs around the areas of Tokyo, Ginza, Shinagawa, Shinjuku, and Ikebukuro.

It is assumed that a male in his fifties is driving the moving object (422), the identifier of which is "YYYYY", the color of which is "brown", and the type of which is a truck. It is also assumed that the moving object (422) runs around the areas of Tokyo, Ginza, Shinagawa, Shinjuku, and Ikebukuro.

It is assumed that a female in her thirties is driving the moving object (423), the identifier of which is "ZZZZZ", the color of which is "white", and the type of which is "sedan". It is also assumed that the moving object (423) runs around the areas of Tokyo, Ginza, Shinagawa, Shinjuku, and Ikebukuro.

Suppose that the moving object (421) is running at a position p1 at time t1 (which belong to the spatio-temporal region (411)) at 45 km/h.

Suppose that the moving object (422) is running at a position p2 at time t2 (which belong to the spatio-temporal region (411)) at 55 km/h.

Suppose that the moving object (423) is running at a position p3 at time t3 (which belong to the spatio-temporal region (411)) at 50 km/h.

The data provider (201-1) receives, from the moving object (421), a record 1 that includes the identifier "XXXXX", the time "t1", the position "p1", the vehicle color (red), the vehicle type (cargo truck), the vehicle speed (45 km/h), and male in twenties.

The data provider (201-1) receives, from the moving object (422), a record 2 that includes the identifier "YYYYY", the time "t2", the position "p2", the vehicle color (brown), the vehicle type (truck), the vehicle speed (55 km/h), and male in fifties.

The data provider (201-1) receives, from the moving object (423), a record 3 that includes the identifier "ZZZZZ", the time "t3", the position "p3", the vehicle color (white), the vehicle type (sedan), the vehicle speed (50 km/h), and female in thirties.

The data provider (201-1) integrates the records 1 to 3 into a record aggregate 1. An example of the record aggregate 1 (501) is illustrated in FIG. 5. The record aggregate 1 (501) includes the record 1 (511), the record 2 (512), and the record 3 (513). The data provider (201-1) transmits the record aggregate 1 (501) to the data aggregator (202). The data provider (201-1) can transmit the individual records 1 to 3 to the data aggregator (202) instead of the record aggregate 1. When the individual records 1 to 3 are transmitted to the data aggregator (202), the data aggregator (202) can integrate the records 1 to 3 into the record aggregate 1 (501). The data aggregator (202) can store the record aggregate 1 (501) in the record repository (211).

Additionally, it is assumed that the moving object (421) is running at a position p4 at time t4 (which belong to the spatio-temporal region (412)) at 50 km/h.

It is also assumed that the moving object (422) is running at a position p5 at time t5 (which belong to the spatio-temporal region (412)) at 55 km/h.

It is further assumed that the moving object (423) is running at a position p6 at time t6 (which belong to the spatio-temporal region (412)) at 60 km/h.

The data provider (201-1) receives, from the moving object (421), a record 4 that includes the identifier "XXXXX", the time "t4", the position "p4", the vehicle color (red), the vehicle type (cargo truck), the vehicle speed (50 km/h), and male in twenties.

The data provider (201-1) receives, from the moving object (422), a record 5 that includes the identifier "YYYYY", the time 15", the position "p5", the vehicle color (brown), the vehicle type (truck), the vehicle speed (55 km/h), and male in fifties.

The data provider (201-1) receives, from the moving object (423), a record 6 that includes the identifier "ZZZZZ", the time "t6", the position "p6", the vehicle color (white), the vehicle type (sedan), the vehicle speed (60 km/h), and female in thirties.

The data provider (201-1) integrates the records 4 to 6 into a record aggregate 2. The data provider (201-1) transmits the record aggregate 2 to the data aggregator (202). The data provider (201-1) can transmit the individual records 4 to 6 to the data aggregator (202) instead of the record aggregate 2. When the individual records 4 to 6 are transmitted to the data aggregator (202), the data aggregator (202) can integrate the records 4 to 6 into the record aggregate 2. The data aggregator (202) can store the record aggregate 2 in the record repository (211).

In addition, the data provider (201-1) can integrate the record aggregates 1 and 2 into an integrated record aggregate A because the records having the same identifiers exist in the records aggregates 1 and 2. An example of the integrated record aggregate A (502) is illustrated in FIG. 5. Although records (521 to 526) are sorted in the integrated record aggregate A (502) by using the identifier as the first key and using the time t as the second key, sorting is not mandatory.

A record aggregate obtained when the moving objects (421, 422, and 423) pass through the spatio-temporal region (413) is transmitted to the data aggregator (202) from the data provider (201-2). Similarly, record aggregates obtained when the moving objects (421, 422, and 423) pass the spatio-temporal region (414) and the spatio-temporal region (415) are also transmitted to the data aggregator (202) from the data provider (201-3).

The data aggregator (202) can obtain the records regarding the identifier "XXXXX" from the record repository (211) in response to a data search request. The data aggregator (202) associates the plurality of records that include the identifier "XXXXX" with each other. This association allows the data aggregator (202) to know personal information associated with the moving object (421), e.g., the vehicle color (red), the vehicle type (cargo truck), the age of the driver (twenties), and the gender of the driver (male), in addition to information about when, where, and how the moving object (421) which is identified from the identifier "XXXXX" has moved.

Similarly, the data aggregator (202) can obtain the records regarding the identifier "YYYYY" from the record repository (211) in response to a data search request. The data aggregator (202) associates the plurality of records that include the identifier "YYYYY" with each other. This association allows the data aggregator (202) to know personal information associated with the moving object (422), e.g., the vehicle color (brown), the vehicle type (truck), the age of the driver (fifties), and the gender of the driver (male), in addition to information about when, where, and how the moving object (422) which is identified from the identifier "YYYYY" has moved.

Likewise, the data aggregator (202) can obtain the records regarding the identifier "ZZZZZ" from the record repository (211) in response to a data search request. The data aggregator (202) associates the plurality of records that include the identifier "ZZZZZ" with each other. This association allows the data aggregator (202) to know personal information associated with the moving object (423), e.g., the vehicle color (white), the vehicle type (sedan), the age of the driver (thirties), and the gender of the driver (female) in addition to information when, where, and how the moving object (423) which is identified from the identifier "ZZZZZ" has moved.

In the above manner, the data aggregator (202) can know the color and type of the vehicles and the age and gender of the drivers. In the case of the aforementioned example, by disclosing the data of the vehicle color, the vehicle type, the age of the driver, or the gender of the driver, one of the moving object (421), the moving object (422), and the moving object (423) associated with the disclosed data is identified. This leads to leakage of personal information and is problematic in terms of protection of personal information.

Accordingly, the data aggregator (202) performs the following process in accordance with an embodiment of the present invention in order to protect personal information. More specifically, the data aggregator (202) calculates so that there are k or more moving objects (k is an integer equal to or greater than 2) that satisfy the condition that a moving object that is associated with a record to be disclosed in response to a data search request passes through L regions having certain ranges within certain time ranges (L is an integer greater than or equal to 1), a range $w_j$ and/or a passing time range $(s_j, e_j)$ for the range $w_j$ for each of the L regions ($s_j$ represents start time of the passage time range, $e_j$ represents end time of the passage time range, and j is an integer of 1, 2, ..., L)

In the example of FIG. 4, there are five spatio-temporal regions (411 to 415). Accordingly, the data aggregator (202) calculates, for each of the spatio-temporal regions (411 to 415), a range $w_j$ of the spatio-temporal region and/or a passing time range $(s_j, e_j)$ of the range $w_j$ so that there are k or more moving objects (k is an integer greater than or equal to 2) that satisfy the condition that the moving objects pass through the range within the certain time range. By extending the range w, the number of moving objects included in the extended range $w_j$ increases (see FIG. 6A below). Additionally, by extending, or forwardly or backwardly shifting the passing time range $(s_j, e_j)$, the number of moving objects included in the extended or shifted passing time range $(s_j, e_j)$ increases (see FIG. 6B below). Furthermore, by extending the range $w_j$ and by extending, or forwardly or backwardly shifting the passing time range $(s_j, e_j)$, the number of moving objects included the extended range $w_j$ and the extended or shifted passing time range $(s_j, e_j)$ increases.

FIG. 5 illustrates examples of record aggregates that can be used in an embodiment of the present invention.

The record aggregates (501 and 502) include individual records. A record is unit data. Each record includes an identifier of a moving object and attribute values associated with the identifier. In addition to attribute values that determine a time space, i.e., time t and a position p, the attribute values include attribute values of attributes regarding the moving object located at the position p at the time t.

FIG. 6A illustrates that by extending the range w, the number of moving objects included in the extended range $w_j$ increases in an embodiment of the present invention.

Before extension of the range w, three moving objects 421, 422, and 423 are in the spatio-temporal region (411). On the other hand, by extending the range w of the spatio-temporal region (411) (611, $w_j$), the number of moving objects increases to a total of six, i.e., three denoted by 621, 622, and 623 in addition to the three denoted by 421, 422, and 423. Since a plurality of moving objects (421, 621, 622, and 623) having the attribute value associated with the moving object (421), e.g., the vehicle type (cargo truck), exist in the range $w_j$, the moving object (421) is no longer identified from the disclosed attribute value (cargo truck) even if the attribute value (cargo truck) of the moving object (421) is disclosed. That is, the moving objects (421, 621, 622, and 623) are disclosed as vehicles that have the same behavior and the same attribute value (cargo truck). Thus, even if the attribute value (cargo truck) of the moving object (421) is disclosed, personal information of a data owner of the moving object (421) is protected.

FIG. 6B illustrates that by extending or forwardly or backwardly shifting the passing time range $(s_j, e_j)$, the number of moving objects included in the extended or shifted time range $(s_j, e_j)$ increases in an embodiment of the present invention.

Before extension or forward or backward shifting of the passing time range $(s_j, e_j)$, three moving objects 421, 422, and 423 are in the spatio-temporal region (411). On the other hand, by extending or forwardly or backwardly shifting the passing time range $(s_j, e_j)$ (612), the number of moving objects increases to a total of six, i.e., three denoted by 631, 632, and 633 in addition to the three denoted by 421, 422, and 423. Since a plurality of moving objects (421, 631, 632, and 633) having the attribute value associated with the moving object (421), e.g., the vehicle type (cargo truck), exist in the extended or shifted time range $(s_j, e_j)$, the moving object (421) is no longer identified from the disclosed attribute value (cargo truck) even if the attribute value (cargo truck) of the moving object (421) is disclosed. That is, the moving objects (421, 631, 632, and 633) are disclosed as vehicles having the same behavior and the same attribute value (cargo truck). Thus, even if the attribute value (cargo truck) of the moving object (421) is disclosed, personal information of a data owner of the moving object (421) is protected.

FIG. 7 illustrates conversion of attribute values into numerical values in records used in an embodiment of the present invention in order to determine an aggregate value by using the attribute values.

The aggregate value determined by using the attribute values is used for determining whether to disclose the aggregate value. More specifically, when a first moving object is in a calculated range $w_j$ within a calculated passing time range $(s_j, e_j)$ and a second moving object is also in the calculated range $w_j$ within the calculated passing time range $(s_j, e_j)$, the anonymizing unit (304) replaces a first value calculated from at least one attribute value (first attribute value) associated with an identifier of the first moving object in record aggregates by a second value calculated from at least one attribute value (second attribute value) associated with an identifier of the second moving object in the record aggregates, thereby being able to control a way of selecting the first attribute value so that an aggregate value calculated after the replacement with the second value completely matches an aggregate value calculated from the first value.

The way of selecting the first attribute value will be described below for a record aggregate (701) of FIG. 7.

The record aggregate (701) includes records (721 to 723) that are the same as the records (511 to 513) of the record aggregate (501) of FIG. 5, respectively. The record aggregate (701) also includes records (724 and 725) in addition to the records (721 to 723). It is assumed that times t1 to t5 and positions p1 to p5 are included in one spatio-temporal region (e.g., 411 of FIG. 4) that is detected by one data provider.

The calculating unit (303) of the data aggregator (202) converts attribute values into numerical values in accordance with a predetermined rule. An attribute value of the attribute "time" can be converted into, for example, a serial value. An attribute value of the attribute "position" can be converted into, for example, the degrees/minutes/seconds notation. An attribute value of the attribute "color" can be converted into, for example, a color code. Since an attribute value of the attribute "vehicle speed" is a numerical value, the attribute value does not have to be changed or can be converted into a numerical value such that "0 to 10 km/h" is "1", "10 to 20 km/h" is "2", "20 to 30 km/h" is "3", "30 to 40 km/h" is "4", and "40 to 50 km/h" is "5" (and so on). The attribute "driver" can be converted into an attribute value to which numerical values of the age (numerical value) and the male (numerical value "1") or the female (numerical value "0") are combined. The resulting record aggregate is illustrated as 702 in FIG. 7.

Suppose that the calculating unit (303) calculates, for records (731, 732, and 733) of the record aggregate (702), an aggregate value (first aggregate value) by substituting attribute values of four attributes, i.e., an attribute 1 (color), an attribute 2 (vehicle type), an attribute 3 (vehicle speed), and an attribute 4 (driver), into a predetermined function.

On the other hand, suppose that the calculating unit (303) replaces all attribute values of the record (731) out of the records (731, 732, and 733) with the attribute values of the record (732). More specifically, the calculating unit (303)

calculates, for the records (732, 732, and 733), an aggregate value (second aggregate value) by substituting the attribute values of the four attributes, i.e., the attribute 1 (color), the attribute 2 (vehicle type), the attribute 3 (vehicle speed), and the attribute 4 (driver), into the predetermined function. In this case, the first aggregate value does not match the second aggregate value. Accordingly, disclosure of an attribute value that is identified with the identifier of the record (731) or data that is determined from the attribute value leads to disclosure of personal information of a data owner identified with the identifier of the record (731).

Similarly, suppose that the calculating unit (303) replaces all attribute values of the record (731) out of the records (731, 732, and 733) with the attribute values of the record (733). That is, the calculating unit (303) calculates, for the records (733, 732, and 733), an aggregate value (third aggregate value) by substituting the attribute values of the four attributes, i.e., the attribute 1 (color), the attribute 2 (vehicle type), the attribute 3 (vehicle speed), and the attribute 4 (driver), into the predetermined function. In this case, the first aggregate value does not match the third aggregate value. Accordingly, disclosure of an attribute value that is identified with the identifier of the record (731) or data that is determined from the attribute value leads to disclosure of personal information of a data owner identified with the identifier of the record (731).

Therefore, when only the records (731 to 733) exist, the attribute value that is identified with the identifier of the record (731) or the data that is determined from the attribute value is not discloseable. Similarly, an attribute value that is identified with the identifier of the record (732) or the record (733) or data that is determined from the attribute value is not discloseable.

Accordingly, in one embodiment of the present invention, the following process is performed. The calculating unit (303) calculates, for example, for the records (731, 732, 733, and 734), an aggregate value (fourth aggregate value) by substituting attribute values of the four attributes, i.e., the attribute 1 (color), the attribute 2 (vehicle type), the attribute 3 (vehicle speed), and the attribute 4 (driver) into a predetermined function.

On the other hand, suppose that the calculating unit (303) replaces all attribute values of the attributes 1 to 4 of the record (731) out of the records (731, 732, 733, and 734) with the attribute values of the attributes 1 to 4 of the record (734). More specifically, the calculating unit (303) calculates, for the records (734, 732, 733, and 734), an aggregate value (fifth aggregate value) by substituting the attribute values of the four attributes, i.e., the attribute 1 (color), the attribute 2 (vehicle type), the attribute 3 (vehicle speed), and the attribute 4 (driver), into the predetermined function. In this case, since the values of the attributes 1 to 4 of the record (731) are the same as the values of the attributes 1 to 4 of the record (734), respectively, the fifth aggregate value completely matches the fourth aggregate value even if all attribute values of the attributes 1 to 4 of the record (731) are replaced with the attribute values of the attributes 1 to 4 of the record (734). That is, even if all attribute values of the attributes 1 to 4 of the record (731) are replaced with the attribute values of the attributes 1 to 4 of the record (734), the replacement does not affect the aggregate values. Accordingly, even if the attribute values 1 to 4 that are identified with the identifier of the record (731) or pieces of data that are determined from the attribute values 1 to 4 are disclosed, the disclosure does not lead to disclosure of personal information of a data owner identified with the identifier of the record (731). The calculating unit (303) selects records to be used for determining the aggregate value in the above manner so that the aggregate values match, thereby being able to determine a discloseable record and attributes thereof.

Suppose that the calculating unit (303) then calculates, for example, for the records (731, 732, 733, and 735), an aggregate value (sixth aggregate value) by substituting the attribute values of the four attributes, i.e., the attribute 1 (color), the attribute 2 (vehicle type), the attribute 3 (vehicle speed), and the attribute 4 (driver), into a predetermined function.

On the other hand, suppose that the calculating unit (303) replaces all attribute values of the attributes 1 to 4 of the record (731) out of the records (731, 732, 733, and 735) with the attribute values of the attributes 1 to 4 of the record (735). More specifically, the calculating unit (303) calculates, for the records (735, 732, 733, and 735), an aggregate value (seventh aggregate value) by substituting the attribute values of the four attributes, i.e., the attribute 1 (color), the attribute 2 (vehicle type), the attribute 3 (vehicle speed), and the attribute 4 (driver), into the predetermined function. In this case, since the value (#ffffff) of the attribute 1 of the record (735) differs from the value (#ff0000) of the attribute 1 of the record (731), the seventh aggregate value does not completely match the sixth aggregate value when all attribute values of the attributes 1 to 4 of the record (731) are replaced with the attribute values of the attributes 1 to 4 of the record (735). That is, when all attribute values of the attributes 1 to 4 of the record (731) are replaced with the attribute values of the attributes 1 to 4 of the record (735), the replacement affects the aggregate values. Accordingly, disclosure of an attribute value (e.g., the attribute value 1) that is identified with the identifier of the record (731) leads to disclosure of personal information of a data owner that is identified with the identifier of the record (731).

Accordingly, the following process is performed in another embodiment of the present invention. Suppose that the calculating unit (303) replaces all attribute values of the attributes 2 to 4, except for the attribute 1, of the record (731) with the attribute values of the attributes 2 to 4, except for the attribute 1, of the record (735). More specifically, the calculating unit (303) calculates, for the records (735, 732, 733, and 735), an aggregate value (eighth aggregate value) by substituting the attribute values of the three attributes, i.e., the attribute 2 (vehicle type), the attribute 3 (vehicle speed), and the attribute 4 (driver), except for the attribute 1 (color), into a predetermined function. In this case, since the values of the attributes 2 to 4 of the record (735) are the same as the values of the attributes 2 to 4 of the record (731), respectively, the eighth aggregate value completely matches the seventh aggregate value even if the attribute values of the attributes 2 to 4 of the record (731) are replaced with the attribute values of the attributes 2 to 4 of the record (735). That is, even if the attribute values of the attributes 2 to 4 of the record (731) are replaced with the attribute values of the attributes 2 to 4 of the record (735), the replacement does not affect the aggregate values. Accordingly, even if the attribute values 2 to 4 that are identified with the identifier of the record (731) or pieces of data that are determined from the attribute values 2 to 4 are disclosed, the disclosure does not lead to disclosure of personal information of a data owner identified with the identifier of the record (731). The calculating unit (303) selects attributes used for determining the aggregate value in the above manner so that the aggregate values match, thereby being able to determine a discloseable record and attributes thereof.

Figure 8:
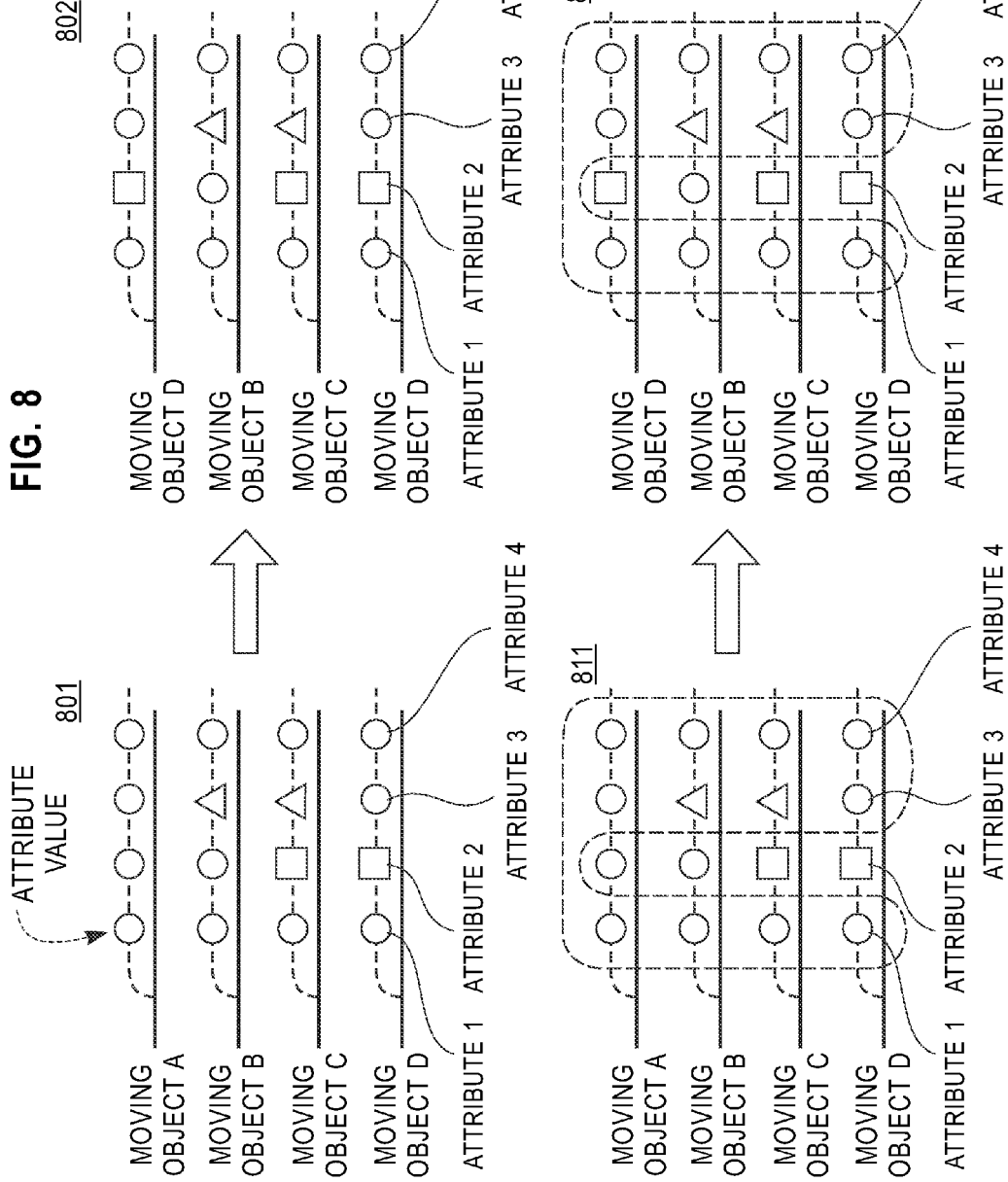
FIG. 8 illustrates an example in which the data aggregator computer changes a way of selecting an attribute so that no influence is caused on aggregate values according to an embodiment of the present invention.

FIG. 8 illustrates an example in which the data aggregator (202) changes a way of selecting attributes so that no influence is caused on aggregate values in an embodiment of the present invention.

Identifiers of moving objects A to D are each associated with attribute values of attributes 1 to 4 (801 to 812). For convenience, each of the attribute values of the attributes 1 to 4 is denoted by ◯, Δ, or ═. The attribute values of the attributes 1 to 4 of the moving object A are ◯◯◯◯. The attribute values of the attributes 1 to 4 of the moving object B are ◯◯Δ◯. The attribute values of the attributes 1 to 4 of the moving object C are ◯□Δ◯. The attribute values of the attributes 1 to 4 of the moving object D are ◯□◯◯.

Suppose that the calculating unit (303) calculates an aggregate value (first aggregate value) by substituting the four attribute values of each of the moving objects A to D into a predetermined function (801). Suppose that the calculating unit (303) then replaces all attribute values of the moving object A with the attribute values of the moving object D (802). More specifically, suppose that the calculating unit (303) calculates an aggregate value (second aggregate value) by substituting the four attribute values of each of the moving objects D, B, C, and D into the predetermined function. Since the attribute value □ of the attribute 2 of the moving object D differs from the attribute value ◯ of the attribute 2 of the moving object A, the second aggregate value does not match the first aggregate value. Thus, disclosure of the attribute value that is identified with the identifier of the moving object A or data that is determined from the attribute value (i.e., trace data) leads to disclosure of personal information of a data owner that is identified with the identifier of the moving object A.

Accordingly, the following process is performed in one embodiment of the present invention. It is assumed that the calculating unit (303) selects the attribute values of the attributes 1, 3, and 4, except for the attribute 2, from the attributes 1 to 4 of the moving objects A to D, and calculates an aggregate value (third aggregate value) by substituting these selected attribute values into a predetermined function (811). It is also assumed that the calculating unit (303) then replaces the attribute values of the attribute 1, 3, and 4, except for the attribute 2, of the moving object A with the attribute values of the attributes 1, 3, and 4, except for the attribute 2, of the moving object D (812), respectively. That is, it is assumed that the calculating unit (303) calculates an aggregate value (fourth aggregate value) by substituting the three attribute values of each of the moving objects D, B, C, and D into the predetermined function. Since the attribute values of the attributes 1, 3, and 4 of the moving object D are the same as the attribute values of the attribute 1, 3, and 4 of the moving object A, respectively, the fourth aggregate value completely matches the third aggregate value. That is, even if the attribute values of the attributes 1, 3, and 4 of the moving object A are replaced with the attribute values of the attributes 1, 3, and 4 of the moving object D, respectively, the replacement does not affect the aggregate values (i.e., the third and fourth aggregate values). Accordingly, even if the attribute values 1, 3, and 4 that are identified with the identifier of the moving object A or pieces of data that are determined from the attribute values 1, 3, and 4 (i.e., trace data) are disclosed, the disclosure does not lead to disclosure of personal information of a data owner that is identified with the identifier of the moving object A. The calculating unit (303) controls the way of selecting the attribute values so that the aggregate values completely match (that is, selects the attribute values used for aggregation so that the aggregate values completely match) in the above manner, thereby being able to determine discloseable trace data.

Figure 9A:
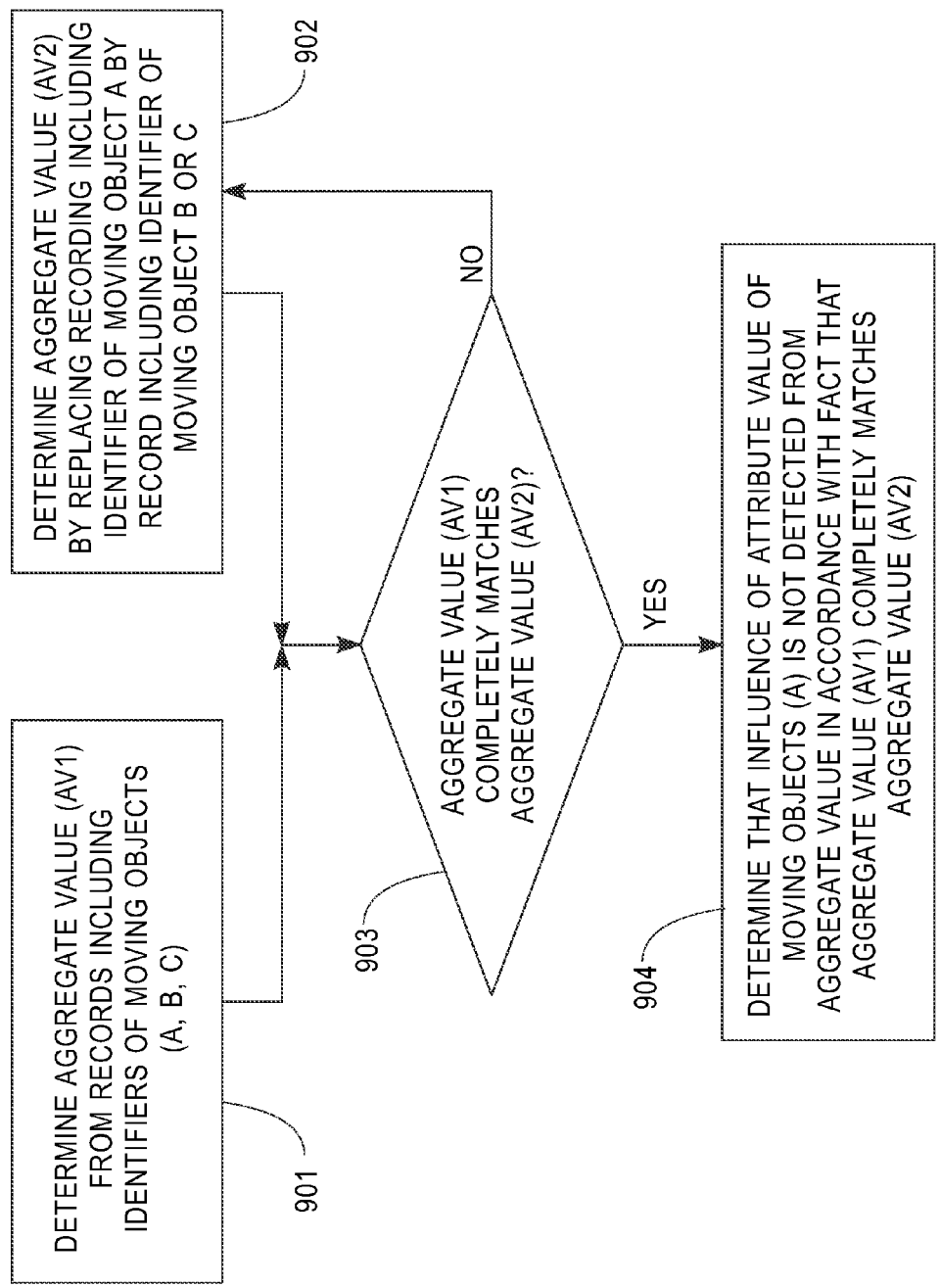
FIG. 9A illustrates a flowchart of whether trace data can be disclosed by confirming that no influence is caused on aggregate values performed by the data aggregator computer according to an embodiment of the present invention.

FIG. 9A illustrates a flowchart for disclosing trace data after confirming that no influence is caused on aggregate values performed by the data aggregator (202) in an embodiment of the present invention.

In step 901, the calculating unit (303) determines an aggregate value (AV1) from attribute values of records that include identifiers of moving objects (e.g., A, B, and C).

In step 902, the calculating unit (303) replaces all attribute values of the record including the identifier of the moving object A out of the moving objects (e.g., A, B, and C) with attribute values of the record including the identifier of the moving object B or C, and determines an aggregate value (AV2) in accordance with a method (e.g., a predetermined function) that is the same as the method with which the aggregate value has been determined in step 901.

In step 903, the calculating unit (303) compares the aggregate value (AV1) with the aggregate value (AV2) to determine whether the aggregate value (AV1) completely matches the aggregate value (AV2). If the aggregate value (AV1) completely matches the aggregate value (AV2), the process proceeds to step 904. On the other hand, if the aggregate value (AV1) does not completely match the aggregate value (AV2), the process returns to step 902.

In step 904, in accordance with the fact that the aggregate value (AV1) completely matches the aggregate value (AV2), the anonymizing unit (304) determines that the influence of the attribute value (which is also unique data) of the moving object (A) is not determined from the aggregate value.

On the other hand, the process returns to step 902 in accordance with the fact that the aggregate value (AV1) does not completely match the aggregate value (AV2), and the anonymizing unit (304), for example, changes the attribute value of the record that includes the identifier of the moving object, changes the moving object whose attribute value replaces the attribute value of the moving object (A) into another moving object to change the attribute value, or replaces the moving object or increases/decreases the number of moving objects to change the attribute value. The process again proceeds to step 903, the calculating unit (303) compares the aggregate value (AV1) with the aggregate value (AV2). The number of pieces of discloseable trace data can decrease by changing the attribute value.

Figure 9B:
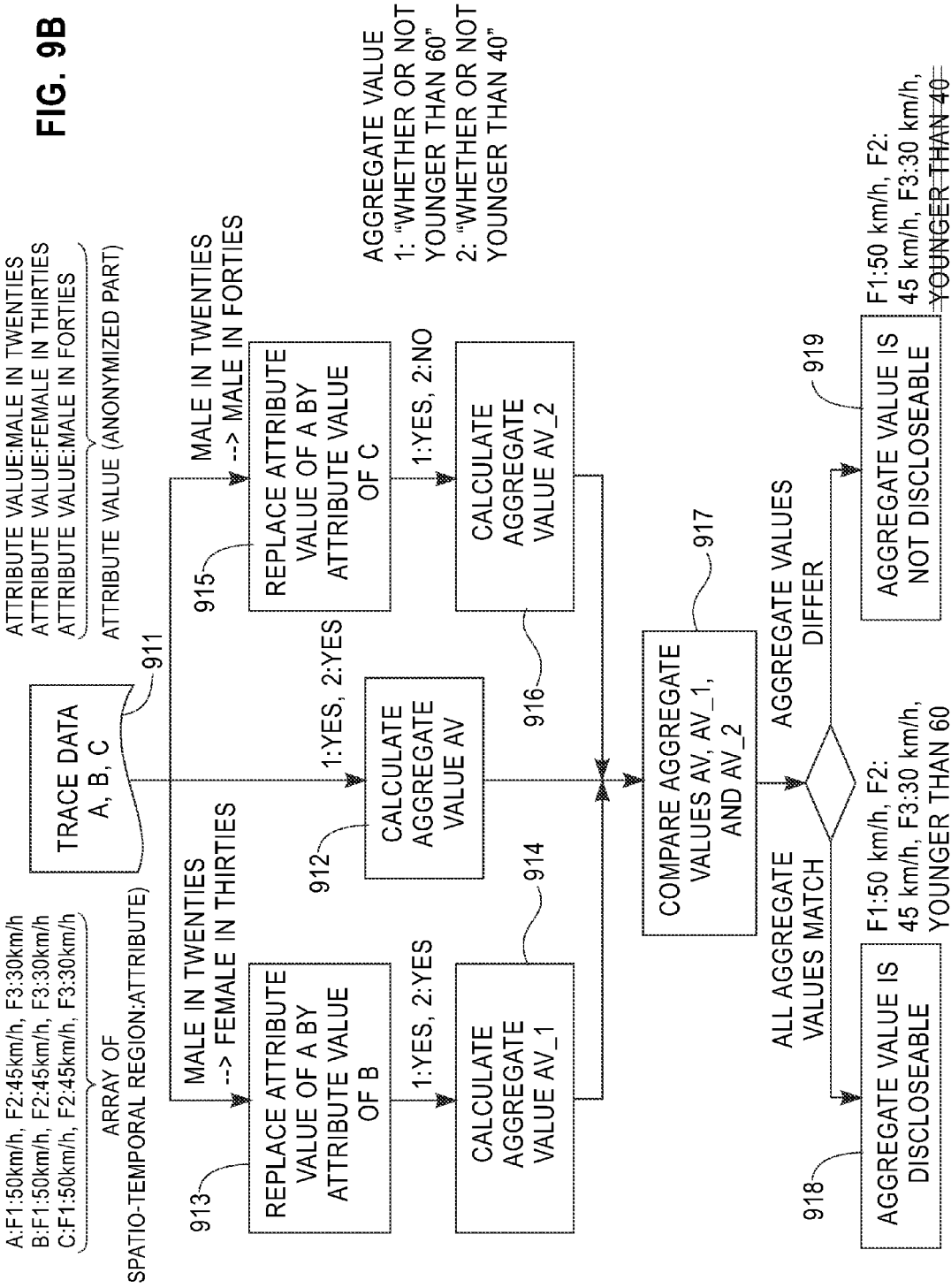
FIG. 9B illustrates two examples in which the data aggregator discloses trace data in accordance with the fact that aggregate values completely match according to an embodiment of the present invention.

FIG. 9B illustrates concrete examples 1 and 2 in which the data aggregator (202) discloses trace data in accordance with the fact that aggregate values completely match in an embodiment of the present invention.

The concrete example 1 is an example in which discloseable trace data is checked in accordance with a condition 1 that data "younger than 60" ("whether or not the driver is younger than 60") is discloseable as an aggregate value of trace data related to a moving object. It is assumed that the threshold k for the number of moving objects is three.

The concrete example 2 is an example in which discloseable trace data is checked in accordance with a condition 2 that data "younger than 40" ("whether or not the driver is younger than 40") is discloseable as an aggregate value of trace data related to a moving object. It is assumed that the threshold k for the number of moving objects is three.

In step 911, the calculating unit (303) determines pieces of trace data A, B, and C using the attribute values of the records that include the identifiers of three moving objects A, B, and C, respectively. As a result, it is assumed that the trace data A is "A: F1: 50 km/h, F2: 45 km/h, F3: 30 km/h, attribute value: male in twenties", the trace data B is "B: F1: 50 km/h, F2: 45 km/h, F3: 30 km/h, attribute value: female in thirties", and the trace data C is "C: F1: 50 km/h, F2: 45 km/h, F3: 30 km/h, attribute value: male in forties".

The pieces of trace data A, B, and C are selected so that three spatio-temporal regions F1, F2, and F3 and the attribute value of the attribute (average speed) that is associated with the respective spatio-temporal regions (F1: 50 km/h, F2: 45 km/h, and F3: 30 km/h) match. Accordingly, the moving objects A, B, and C are completely identical and cannot be discriminated from one another only from the spatio-temporal regions F1, F2, and F3 and the attribute (average speed) that is associated with the respective spatio-temporal regions in the pieces of trace data A, B, and C. Accordingly, the anonymity that the threshold k is equal to three is satisfied.

However, when focusing on the attributes (gender and age) of the pieces of trace data A, B, and C, the attribute values are "male in twenties", "female in thirties", and "male in forties", and thus the moving objects A, B, and C are identifiable from the attributes (gender and age). If the attributes (gender and age) are disclosed, the moving objects A, B, and C are to be identified. Accordingly, the anonymity that the threshold k is equal to three is not satisfied.

On the other hand, the pieces of trace data A, B, and C can possibly be disclosed by performing aggregation processing for controlling the way of selecting the attribute values as mentioned in the concrete examples 1 and 2 above instead of directly using the attributes (gender and age).

The concrete example 1 will be described below.

In step 912, the calculating unit (303) calculates an aggregate value AV from the pieces of trace data A, B, and C. In step 912, the condition 1 ("whether or not the driver is younger than 60") is satisfied.

In step 913, the calculating unit (303) replaces the attribute value (male in twenties) of the trace data A with the attribute value (female in thirties) of the trace data B.

In step 914, the calculating unit (303) calculates an aggregate value (AV_1) from the attribute values of the pieces of trace data B, B, and C in accordance with the same method as that used in step 912. In step 914, the condition 1 ("whether or not the driver is younger than 60") is satisfied.

In step 915, the calculating unit (303) replaces the attribute value (male in twenties) of the trace data A with the attribute value (male in forties) of the trace data C.

In step S916, the calculating unit (303) calculates an aggregate value AV_2 from the attribute values of the pieces of trace data C, B, and C in accordance with the same method as that used in step 912. In step 916, the condition 1 ("whether or not the driver is younger than 60") is satisfied.

In step 917, the calculating unit (303) compares the aggregate values AV, AV_1, and AV_2 with each other. In the concrete example 1, the aggregate values AV_1 and AV_2 calculated in steps 914 and 916, respectively, match the aggregate value AV calculated in step 912. Accordingly, the process proceeds to step 918.

In step 918, since all of the aggregate values AV, AV_1, and AV_2 match, the anonymizing unit (304) determines that the trace data and the controlled attribute (younger than 60) are discloseable. This is because, even if the attribute value (male in twenties) of the trace data A is replaced with the attribute value (female in thirties) of the trace data B in step 913 and even if the attribute value (male in twenties) of the trace data A is replaced with the attribute value (male in forties) of the trace data C, the condition 1 ("whether or not the driver is younger than 60") is satisfied. Accordingly, it is possible to confirm that data for identifying the moving object A from the moving objects A, B, and C does not leak even if the controlled attribute "younger than 60" is disclosed. Thus, the anonymizing unit (304) determines that the trace data and the controlled attribute value (attribute value of derived attribute information), as needed, are discloseable in the concrete example 1. The discloseable data (anonymized search result) is "F1: 50 km/h, F2: 45 km/h, F3: 30 km/h, and younger than 60".

The concrete example 2 will be described below.

In step 912, the calculating unit (303) calculates the aggregate value (AV) from the pieces of trace data A, B, and C. In step 912, the condition 2 ("whether or not the driver is younger than 40") is satisfied.

In step 913, the calculating unit (303) replaces the attribute value (male in twenties) of the trace data A with the attribute value (female in thirties) of the trace data B.

In step 914, the calculating unit (303) calculates the aggregate value (AV_1) from the attribute values of the pieces of trace data B, B, and C in accordance with the same method as that used in step 912. In step 914, the condition 2 ("whether or not the driver is younger than 40") is satisfied.

In step 915, the calculating unit (303) replaces the attribute value (male in twenties) of the trace data A by the attribute value (male in forties) of the trace data C.

In step 916, the calculating unit (303) calculates the aggregate value AV_2 from the attribute values of the pieces of trace data C, B, and C in accordance with the same method as that used in step 912. In step 916, the condition ("whether or not the driver is younger than 40") is not satisfied.

In step 917, the calculating unit (303) compares the aggregate values AV, AV_1, and AV_2 with each other. In the concrete example 2, the aggregate value AV_1 calculated in step 914 matches the aggregate value AV calculated in step 912, but the aggregate value AV_2 calculated in step 916 does not match the aggregate value AV calculated in step 912. Accordingly, the process proceeds to step 919.

In step 919, since a difference is caused among the aggregate values AV, AV_1, and AV_2, the anonymizing unit (304) determines that the controlled attribute "whether or not the driver is younger than 40" is not discloseable. This is because the condition 2 ("whether or not the driver is younger than 40") is satisfied when the attribute value (male in twenties) of the trace data A is replaced with the attribute value (female in thirties) of the trace data B in step 913 but, on the other hand, the condition 2 ("whether or not the driver is younger than 40") is not satisfied when the attribute value (male in twenties) of the trace data A is replaced with the attribute value (male in forties) of the trace data C. Accordingly, it is possible to confirm that data for identifying the moving object C from the moving objects A, B, and C leaks if the result of "whether or not the driver is younger than 40" is disclosed. Thus, the anonymizing unit (304) determines that part of the trace data is discloseable but the controlled attribute value (younger than 40) is not discloseable in the concrete example 2. In this case, the discloseable data (anonymized search result) is "F1: 50 km/h, F2: 45 km/h, F3: 30 km/h" and the controlled attribute value (younger than 40) is not disclosed.

Figure 10:
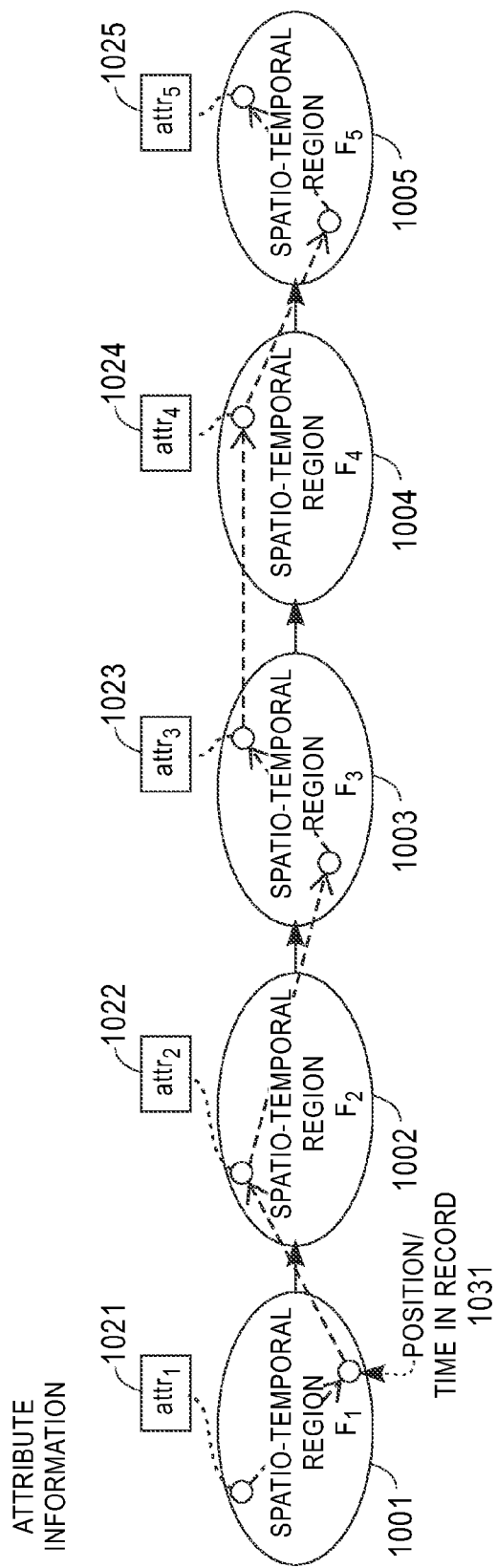
FIG. 10 is a diagram illustrating a relationship between attributes contained in records and anonymized trace data that is obtained by linking spatio-temporal regions according to an embodiment of the present invention.

FIG. 10 is a diagram illustrating a relation between anonymized trace data obtained by anonymizing trace data that is obtained by linking spatio-temporal regions and attributes included in records.

Trace data is data that is obtained by collecting a plurality of records having the same identifier and by sorting the plurality of records, for example, in the chronological order from the oldest time point to the latest time point and that indicates a change in the position (or space) of a moving object based on a temporal change. That is, in this specification, trace data is trace information obtained from a moving object having the same identifier. For example, as illustrated in FIG. 4, the trace data is obtained by collecting the record 1 of the moving object (421) in the spatio-temporal region (411), the record 2 of the moving object (421) in the spatio-temporal region (412), the record 3 of the moving object (421) in the spatio-temporal region (413), the record 4 of the moving object (421) in the spatio-temporal region (414), and the record 5 of the moving object (421) in the spatio-temporal region (415) and by sorting the collected records 1 to 5 in the chronological order.

The anonymized trace data is trace data that is determined after the trace data has been anonymized by the anonymizing unit (304) and that can be subjected to disclosure. Accordingly, the anonymized trace data can be the entire or part of the original trace data. The case in which the anonymized trace data is the entire original trace data corresponds to the case in which the entire original trace data is discloseable. On the other hand, the case in which the anonymized trace data is part of the original trace data corresponds to the case in which part of the original trace data is discloseable. The anonymized trace data is associated with each attribute of the records 1 to 5. The associated attribute can be instructed in, for example, a trace-data search request. For example, the associated attribute is an average speed in each spatio-temporal region. In response to a data search request, the calculating unit (303) can perform information disclosure of the anonymized trace data. In the information disclosure of the anonymized trace data, the records themselves are not necessarily included but, for example, information regarding a change in the position can be included.

A function $F_i$ (i is an integer greater than or equal to 1) in a spatio-temporal domain is a function for arraying spatio-temporal regions $F_1$ to $F_5$ (1001 to 1005) of FIG. 10. It is assumed that the spatio-temporal regions $F_1$ to $F_5$ (1001 to 1005) correspond to the records 1 to 5, respectively.

The array of the function F in the spatio-temporal domain is a function indicating that the position p and the time t are located in the region if F(p, t) is true and are located outside the region if F(p, t) is false. Intuitively, the function F is a function that represents a result of determination "whether a moving object is located in a certain range within a certain time range". That is, points existing in a region having a diameter d from the position p1 that serves as the center between time t1 and t2 can be mathematically represented by the following expression: |p−p1|>d and (t−t1)(t2−t)>0.

The function F can be defined in a data search request.

In the spatio-temporal regions $F_1$ to $F_5$ (1001 to 1005) of FIG. 10, the function $F_i$ (i is an integer greater than or equal to 1) of the spatio-temporal regions can be associated with pieces of attribute information (attr$_1$, attr$_2$, attr$_3$, attr$_4$, and attr$_5$) (1021 to 1025), respectively. The pieces of attribute information (1021 to 1025) can be the same or can be different. The different attribute information refers to, for example, an average speed in each spatio-temporal region. In this case, the pieces of attribute information (1021 to 1025) can be pieces of attribute information of records (1031 to 1035) each including a position and a time that are within the corresponding spatio-temporal region (e.g., information about the position and the time included in the record) or can be pieces of attribute information that can be generated from the pieces of attribute information of the records (i.e., derived attribute information). The derived attribute information is, for example, "average speed in each spatio-temporal region". The derived attribute information "average speed in each spatio-temporal region" is derived when a plurality of records are included for one spatio-temporal region and the average speed is an average of the attribute information "speed" of the plurality of records. A method of creating the pieces of attribute information (1021 to 1025) in the respective regions can be defined in a data search request.

Figure 11:
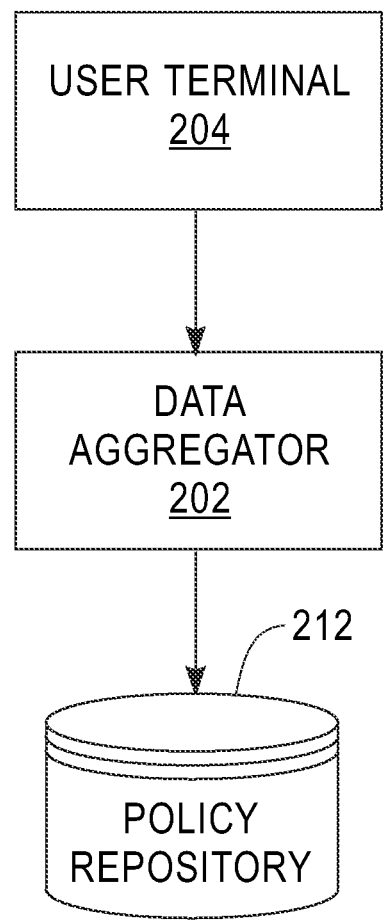
FIG. 11 illustrates a diagram of a system environment protects personal information according to an embodiment of the present invention.

FIG. 11 illustrates a diagram of a system environment that can be used in setting a policy which can be used for protecting personal information in an embodiment of the present invention.

Figure 12:
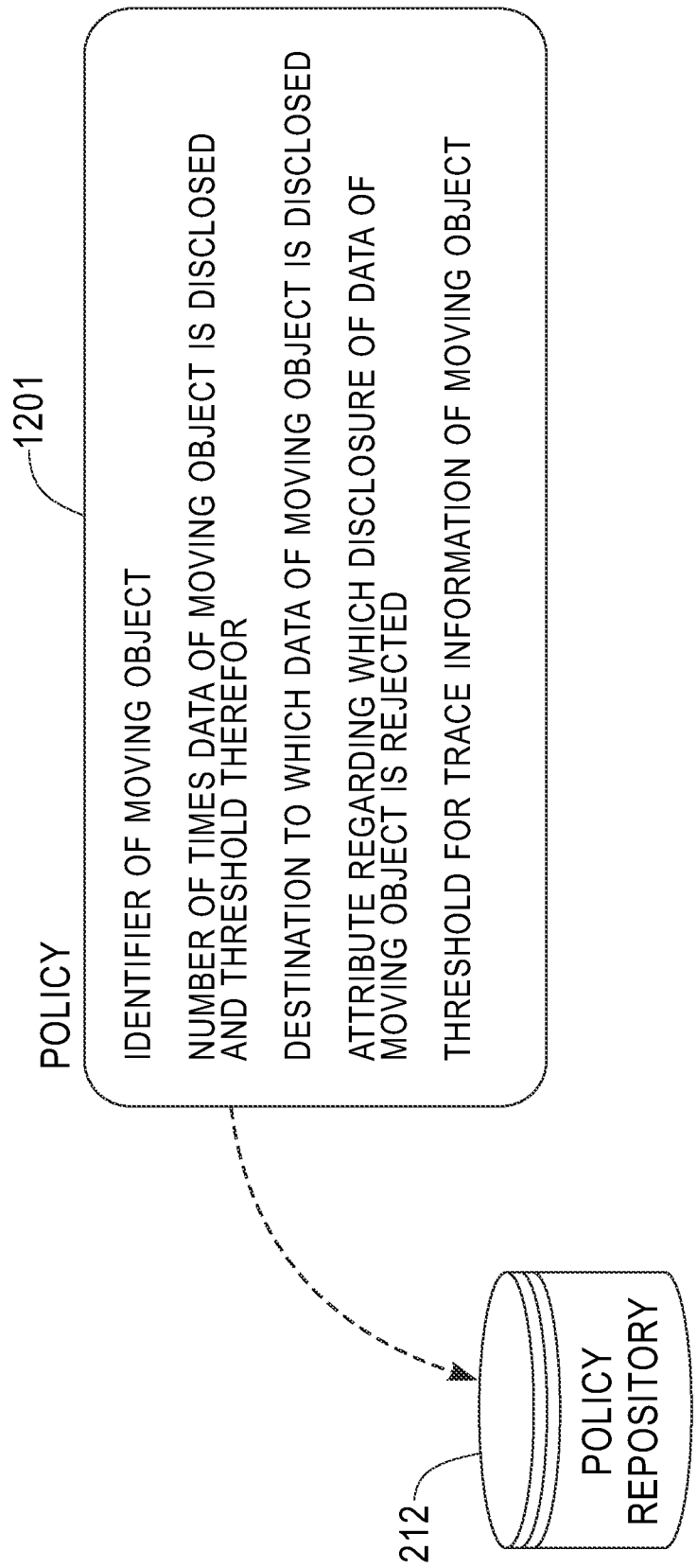
FIG. 12 illustrates an example of a policy controls disclosure of trace data according to an embodiment of the present invention.

A data owner can set or change a policy via the user terminal (204). FIG. 12 illustrates an example of the policy. The policy is stored in the policy repository (212) that is accessible from the data aggregator (202).

The policy repository (212) also stores a policy necessary for utilizing the trace data that has been described in FIG. 10. Utilization of the trace data has to be based on the policy. A concrete example of the policy will be described below.

The policy defines a threshold for anonymizing each trace data. A trace is an array of N spatio-temporal regions denoted by "$F_1, F_2, \ldots, F_N$". Trace data is an array (the length of the array is N) of concrete records of a moving object that passes through the N spatio-temporal regions. There has to be "k" pieces of trace data "$T_1, \ldots, T_k$" and the value "k" serves as the anonymizing threshold. The trace "$F_1, F_2, \ldots, F_N$" and the pieces of attribute information "attr$_1$, attr$_2$, ..., attr$_N$" associated with the trace indicate that conditions are satisfied that (1) there are "k" pieces of trace data "$T_1, \ldots, T_k$", (2) each trace data $T_i$ includes a record array "$r_1, r_2, \ldots, r_N$" satisfying that "$F_1(r_1)$=true, $F_2(r_2)$=true, ..., $F_N(r_N)$=true" and "$A(T_i)$=attr".

"k" can be the maximum value of thresholds that a data owner of each trace data has defined in the policy. The reason why the threshold can be the maximum value is as follows. There can be a case in which a data owner is present for each record and each data owner defines different policy for the record. That is, different thresholds "k" can be defined for each record. In such a case, the maximum value of the different thresholds "k" is used as the threshold.

The trace "$F_1, F_2$, and, $F_N$" and the anonymized attribute attr are included in a search result.

The trace data "$T_1, \ldots, T_k$" and the record array "$r_1, r_2, \ldots, r_N$" are internal variables that are used in anonymization. Since the trace data "$T_1, \ldots, T_k$" is an array of the spatio-temporal regions, the trace data can be used for determining a change of the spatio-temporal regions during anonymization. The record array "$r_1, r_2, \ldots, r_N$" can be used for calculating the attribute information of each spatio-temporal region during anonymization.

A function A is a function for generating the pieces of attribute information "attr$_1$, attr$_2$, ..., attr$_N$" and is included in a data search request.

The anonymizing unit (304) can store, for example, in the policy repository (212), data that includes the number of times of disclosure of data or a destination of disclosure that can be used in the policy. The data can be stored in association with the policy of a moving object that is associated with the data.

FIG. 12 illustrates an example of the policy that can be used for controlling disclosure of trace data in an embodiment of the present invention.

A policy (1201) can include, for example, an identifier for identifying the policy (for example, which can be the same as the identifier of the corresponding moving object), the identifier of the moving object, the number of times of disclosure of data regarding the moving object and a threshold therefor, a destination of disclosure of the data regarding the moving object, an attribute for rejecting disclosure of the data regarding the moving object, and a threshold for trace data of the moving object. Since disclosure of trace data is controlled by using the policy, personal information related to a moving object can be protected on the basis of an intention of a data owner who has set the policy or the default policy setting that has been made by the anonymizing unit (304).

Away of anonymizing trace data using the policy will be described below. The following description will be given for the record aggregate 1 (501) of FIG. 5 serving as an example.

The record aggregate 1 (501) is a set of records that is provided from one data provider (e.g., 201-1) to the data aggregator (202). Such a record aggregate is provided to the data aggregator (202) from one or more data providers. In this way, the data aggregator (202) comes to have a plurality of lines of data regarding the identifier "XXXXX" of the moving object as shown below.

(XXXXX, t1, p1, red, cargo truck, 45, male in twenties)*
(XXXXX, t11, p11, red, cargo truck, 55, male in twenties)
(XXXXX, t12, p12, red, cargo truck, 35, male in twenties)
(XXXXX, t13, p13, red, cargo truck, 15, male in twenties)
(XXXXX, t14, p14, red, cargo truck, 35, male in twenties)
(Note: corresponding to the record (511))

The calculating unit (303) then sorts the records in the chronological order. As a result, the records are organized in the following manner since items other than the vehicle speed are fixed attributes in the above example.

XXXXX-(red, cargo truck, male in twenties, . . . )
(t1, p1, 45) F1
(t11, p11, 55) F1
(t12, p12, 35) F2
(t13, p13, 15) F2
(t14, p14, 35) F3
F1, F2, and F3 represent spatio-temporal regions.

The above result is the trace data. Suppose that (t1, p1) is close to (t11, p11) and (t12, p12) is close to (t13, p13). As a result of the anonymizing process, the trace data includes three spatio-temporal regions F1, F2, and F3. If the "average speed" is set as the attribute information of each spatio-temporal region, the anonymized trace data is denoted as XXXXX-(F1, 50)→(F2, 25)→(F3, 35)
("XXXXX" is not disclosed to the outside).

Since anonymization has completed, there should be "k" moving objects that have the same attribute. Suppose that "k=3" is set in the policy.

When k=3, three moving objects denoted as
XXXXX-(F1, 50)→(F2, 25)→(F3, 35)
YYYYY-(F1, 50)→(F2, 25)→(F3, 35)
ZZZZZ-(F1, 50)→(F2, 25)→(F3, 35)
are present. However, information to be returned as the anonymized search result is (F1, 50)→(F2, 25)→(F3, 35).

Figure 13:
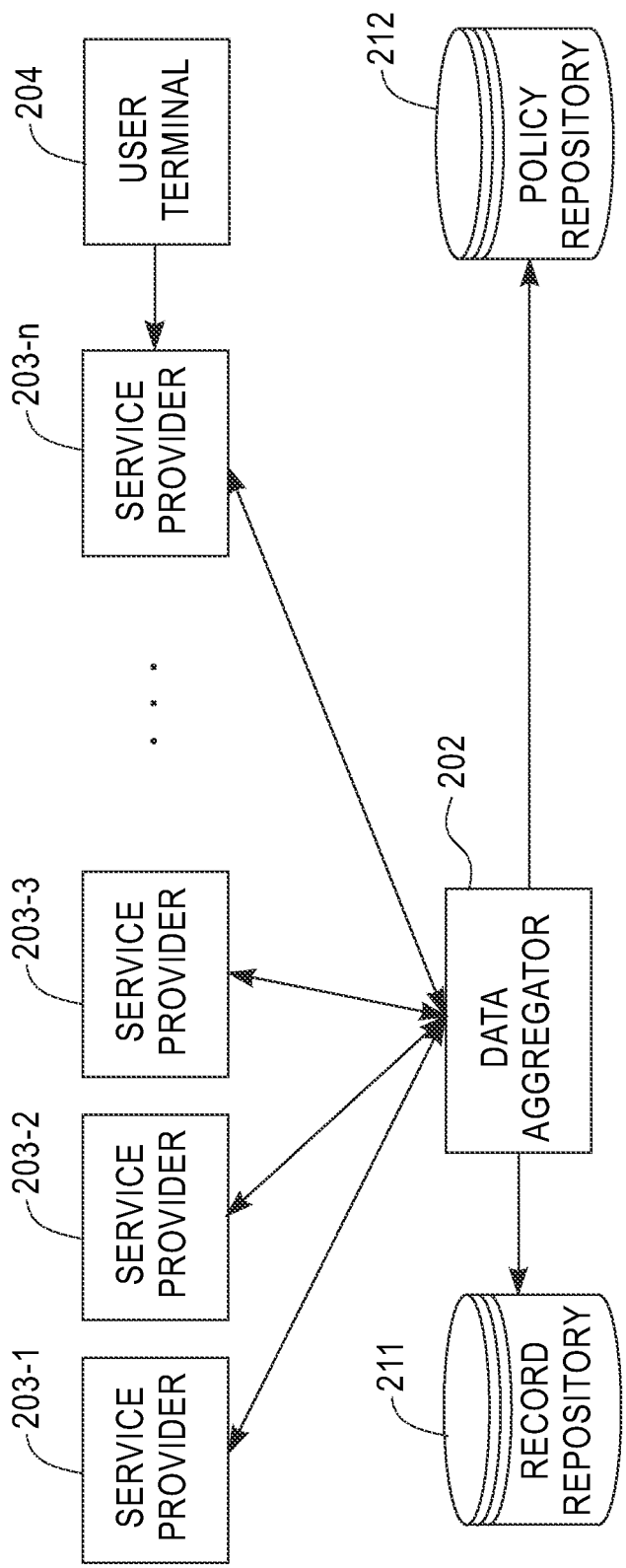
FIG. 13 illustrates a diagram of a system environment makes a data search request according to an embodiment of the present invention.

FIG. 13 illustrates a diagram of a system environment that can be used for making a data search request in an embodiment of the present invention.

A data search requestor can enter a data search request to the user terminal (204) or can enter the data search request to the service providers (203-1 to 203-n) to request the data aggregator (202) to search for data related to a moving object.

A request to search for trace data will be described below.

The request to search for trace data includes a distance function. The distance function can be, for example, one of the following three functions.

(1) Distance function=Positional shift (time range=∞, positional range=minimum); This formula is used for obtaining a trace of a given moving object that has passed through the position at fine-grained distance accuracy regardless of the time range.

(2) Distance function=Time difference (time range=minimum, positional range=∞); This formula is used when a user wishes to know the presence of a moving object at the time range at fine-grained time accuracy regardless of the size of the range.

(3) Distance function=$c_1$*(time width)^$c_2$*(positional shift)^2; This formula is used when a user wishes to know a spatio-temporal range by adjusting the time width and the distance using $c_1$ and $c_2$ as weighting coefficients.

The request to search for the trace data also includes a definition for defining how attribute information associated with each spatio-temporal region is created from the trace data and is associated. The definition can be, for example, derived attribute information, such as an average of the speeds at which the moving object has passed the spatio-temporal regions.

FIG. 14 is a diagram illustrating flowcharts of (A) obtaining a policy, (B) receiving record aggregates, and (C) obtaining trace data in response to reception of a data search request, processing (anonymizing) the obtained trace data, and transmitting the processed result as a search result.

(A) Obtaining Policy

In step 1401, the data aggregator (202) starts a process of obtaining a policy.

In step 1402, the data aggregator (202) receives a policy that has been transmitted from the user terminal (204) of a data owner. The policy can be a newly created policy or a modified policy.

In step 1403, the data aggregator (202) stores the received policy in the policy repository (212).

In step 1404, the data aggregator (202) terminates the process of obtaining a policy.

(B) Receiving Record Aggregates

In step 1411, the record/policy receiving unit (301) of the data aggregator (202) starts a process of receiving record aggregates.

In step 1412, the record/policy receiving unit (301) receives record aggregates from at least one of the data providers (201-1 to 201-n).

In step 1413, the record/policy receiving unit (301) stores the received record aggregates in the record repository (211). The received record aggregates can be integrated and can be stored in the record repository (211) as an integrated record aggregate.

In step 1414, the record/policy receiving unit (301) terminates the process of receiving record aggregates.

(C) Receiving Data Search Request and Transmitting Search Result

In step 1421, the data aggregator (202) starts a process of searching for trace data.

In step 1422, the search-request receiving/search-result transmitting unit (302) receives, from at least one of the service providers (203-1 to 203-n), a data search request entered from a data search requestor. The search-request receiving/search-result transmitting unit (302) supplies the data search request to the calculating unit (303).

In step 1423, the calculating unit (303) searches for data from the record aggregates stored in the record repository (211) in accordance with the data search request. The search result corresponds to the trace data. The calculating unit (303) supplies the trace data to the anonymizing unit (304).

In step 1424, anonymization is performed on the trace data supplied in step 1423. The anonymizing unit (304) performs anonymization of the trace data, for example, by using a unique threshold k that is held by the anonymizing unit (304) (or set in the anonymizing unit (304)) or by obtaining a policy from the policy repository (212) and using the threshold k included in the policy. The anonymizing unit (304) can also perform anonymization of trace data further in accordance with another condition included in the policy. The policy is obtained from the policy repository (212), for example, by identifying the identifier of the moving object, identifying the data owner from the identified identifier, and identifying the policy submitted by the data owner from the identified data owner. More specifically, when the moving object is, for example, a vehicle, the policy is obtained by identifying the VIN (or license number), identifying the data owner from the identified VIN, and identifying the policy submitted by the data owner. The anonymizing unit (304) sends the anonymized search result (which is anonymized trace data) to the search-request receiving/search-result transmitting unit (302).

In step 1425, the search-request receiving/search-result transmitting unit (302) transmits the anonymized search result to the service provider that has transmitted the data search request.

In step 1426, the data aggregator (202) terminates the process of searching for trace data.

What is claimed is:

1. A method of a server computer connected to at least one data provider system to control disclosure of data provided from the at least one data provider system, the method comprising the steps of:
receiving, for at least one vehicle in a first spatio-temporal region, a first record aggregate from at least one data provider system, said first record aggregate comprising, as a unit record, a first identifier for identifying a first recorded vehicle and at least one attribute value associated with said first identifier;
receiving, for at least one vehicle in a second spatio-temporal region, a second record aggregate from said at least one data provider system, said second record aggregate comprising, as a unit record, a second identifier for identifying a second recorded vehicle and at least one attribute value associated with said second identifier, said second identifier comprising at least one of said first identifier;
calculating trace data from said at least one attribute value associated with said first identifier that is present in both received first record aggregates and received second record aggregates in response to a reception of a data search request to search for data related to a candidate vehicle, wherein said trace data is related to said candidate vehicle that corresponds to said data search request;
calculating to satisfy a condition of said candidate vehicle passing through at least one region having certain spatio-temporal ranges within certain time ranges and to satisfy another condition of at least two of said candidate vehicles being present in each of said at least one region, said spatio-temporal range of said at least one region, or a passing time range of said spatial temporal range of each of said at least one region; and
returning calculated trace data or part of said trace data as a search result if said candidate vehicle moves in calculated spatio-temporal ranges within calculated passing time ranges and if said candidate vehicle has said first identifier that is present in both said received first record aggregates and said received second record aggregates, wherein at least one of the steps is carried out by a server computer device, and
wherein when a first vehicle is within said calculated spatio-temporal range within said calculated passing time range and a second vehicle is within said calculated spatio-temporal range within said calculated passing time range, said method further comprises the steps of:
calculating a first aggregate value from said received first record aggregates and said received second record aggregates including said at least one first attribute value associated with an identifier of the first vehicle, said calculating of the first aggregate value performed using a predetermined function;
replacing a first value that represents said at least one first attribute value associated with the identifier of the first vehicle in said received first record aggregates and said received second record aggregates with a second value that represents said at least one second attribute value associated with an identifier of the second vehicle in said received first record aggregates and said received second record aggregates, and calculating a second aggregate value from said received first record aggregates and said received second record aggregates including at least the second value that replaced the first value, said calculating of the second aggregate value performed using the predetermined function;
controlling selection of the first attribute value to enable the first aggregate value to completely match the second aggregate value; and
when the first aggregate value completely matches the second aggregate value, returning, as said search result, said calculated trace data related to said candidate vehicle that corresponds to said data search request or said part of said trace data in accordance with an attribute value of said controlled selection of the first attribute value.

2. The method according to claim 1, wherein said step of returning further comprises the step of:
restricting disclosure of said calculated trace data or said part of said trace data in accordance with a policy associated with said first identifier that is present in both said received first record aggregates and said received second record aggregates.

3. The method according to claim 1, wherein said step of returning further comprises the step of:
restricting disclosure of said calculated trace data or said part of said trace data in accordance with a policy associated with said first identifier that is present in both said received first record aggregates and said received second record aggregates.

4. The method according to claim 2, wherein:
said policy associated with said first identifier comprises constraint data selected from the group consisting of: (i) number of times said trace data related to said first recorded vehicle is being disclosed; (ii) a destination of disclosure of said trace data; and combinations thereof; and
said step of returning further comprises the step of:
restricting disclosure of said calculated trace data related to said candidate vehicle that corresponds to said data search request or said part of said trace data in accordance with said constraint data.

5. The method according to claim 3, wherein:
said policy associated with said first identifier comprises constraint data selected from the group consisting of: (i) number of times said trace data related to said first recorded vehicle is being disclosed; (ii) a destination of disclosure of said trace data; and combinations thereof; and
said step of returning further comprises the step of restricting disclosure of said calculated trace data related to said candidate vehicle that corresponds to said data search request or said part of said trace data in accordance with said constraint data.

6. The method according to claim 4, wherein the step of returning further comprises the step of:
recording said constraint data as a history.

7. The method according to claim 2, wherein said policy is retrieved from a policy repository.

8. The method according to claim 2, wherein said policy is set by a data owner associated with said candidate vehicle or said data provider system.

9. The method according to claim 1, further comprising the step of: storing said received first record aggregates and said received second record aggregates in a record repository.

10. The method according to claim 9, wherein said step of calculating trace data further comprises the step of:
creating trace data from first record aggregates and second record aggregates that have been stored in said record repository in response to said data search request.

11. The method according to claim 1, wherein said step of calculating trace data further comprises the step of:
integrating said first record aggregates and said second record aggregates into one integrated record aggregate; and
sorting records associated with an identifier in said integrated record aggregate by the order of time data.

12. The method according to claim 1, wherein said at least one attribute value comprises values selected from the group consisting of at least one identifier of said candidate vehicle, color of said candidate vehicle, number of said candidate vehicle, type of said candidate vehicle, a speed at a time value, a value regarding a device of said candidate vehicle, name, age, or gender of a driver or a passenger, number of occupants, a state inside or outside said candidate vehicle at said time value, state of said occupant at said time value, and combinations thereof.

13. A computer program product comprising a tangible non-transitory storage device, said storage device including a computer readable program code having computer readable instructions which when implemented, cause a computer to carry out the steps of a method comprising:
receiving, for at least one vehicle in a first spatio-temporal region, a first record aggregate from at least one data provider system, said first record aggregate comprising, as a unit record, a first identifier for identifying a first recorded vehicle and at least one attribute value associated with said first identifier;
receiving, for at least one vehicle in a second spatio-temporal region, a second record aggregate from said at least one data provider system, said second record aggregate comprising, as a unit record, a second identifier for identifying a second recorded vehicle and at least one attribute value associated with said second identifier, said second identifier comprising at least one of said first identifier;
calculating trace data from said at least one attribute value associated with said first identifier that is present in both received first record aggregates and received second record aggregates in response to a reception of a data search request to search for data related to a candidate vehicle, wherein said trace data is related to said candidate vehicle that corresponds to the data search request;
calculating to satisfy a condition of said candidate vehicle passing through at least one region having certain spatio-temporal ranges within certain time ranges and to satisfy another condition of at least two of said candidate vehicles being present in each of said at least one region, said spatio-temporal range of said at least one region, or a passing time range of said spatial temporal range of each of said at least one region; and
returning calculated trace data or part of said trace data as a search result if said candidate vehicle moves in calculated spatio-temporal ranges within calculated passing time ranges and if said candidate vehicle has said first identifier that is present in both said received first record aggregates and said received second record aggregates,
wherein when a first vehicle is within said calculated spatio-temporal range within said calculated passing time range and a second vehicle is within said calculated spatio-temporal range within said calculated passing time range, said method comprises further steps of:
calculating a first aggregate value from said received first record aggregates and said received second record aggregates including said at least one first attribute value associated with an identifier of the first vehicle, said calculating of the first aggregate value performed using a predetermined function;
replacing a first value that that represents said at least one first attribute value associated with the identifier of the first vehicle in said received first record aggregates and said received second record aggregates with a second value that represents said at least one second attribute value associated with an identifier of the second vehicle in said received first record aggregates and said received second record aggregates, and calculating a second aggregate value from said received first record aggregates and said received second record aggregates including at least the second value that replaced the first value, the calculating the second aggregate value performed using the predetermined function;
controlling selection of the first attribute value to enable the first aggregate value to completely match the second aggregate value; and
when the first aggregate value completely matches the second aggregate value, returning, as said search result, said calculated trace data related to said candidate vehicle that corresponds to said data search request or said part of said trace data in accordance with an attribute value of said controlled selection of the first attribute value.

14. The method according to claim 1, wherein said calculating trace data comprises:
calculating to satisfy a condition that a vehicle passing through L regions that have certain ranges within certain time ranges be fulfilled, and
satisfy a condition that k or more vehicles (k is an integer greater than or equal to 2) are present in each of the L regions, or present in a range $w_j$ or a passing time range $(s_j, e_j)$ for range $w_j$ (j is an integer of $1, 2, \ldots, L$) for each of the L regions, wherein
the calculated trace data or part of the trace data is returned as a search result when the vehicle passing through L regions having a same identifier in the received first and second record aggregates moves in the calculated ranges $w_j$ within the calculated passing time ranges $(s_j, e_j)$.

15. A system that controls disclosure of data provided from at least one data provider system, the system comprising:
a memory;
a programmable data processing apparatus in communication with said memory, said programmable data processing apparatus configured to receive, for at least one vehicle in a first spatio-temporal region, a first record aggregate from at least one data provider system, said first record aggregate comprising, as a unit record, a first identifier for identifying a first recorded vehicle and at least one attribute value associated with said first identifier;

said programmable data processing apparatus further configured to receive, for at least one vehicle in a second spatio-temporal region, a second record aggregate from said at least one data provider system, said second record aggregate comprising, as a unit record, a second identifier for identifying a second recorded vehicle and at least one attribute value associated with said second identifier, said second identifier comprising at least one of said first identifier;

said programmable data processing apparatus configured to calculate trace data from said at least one attribute value associated with said first identifier that is present in both received first record aggregates and received second record aggregates in response to a reception of a data search request to search for data related to a candidate vehicle, wherein said trace data is related to said candidate vehicle that corresponds to said data search request;

said programmable data processing apparatus is configured to calculate said trace data to satisfy a condition of said candidate vehicle passing through at least one region having certain spatio-temporal ranges within certain time ranges, and to satisfy another condition of at least two of said candidate vehicles being present in each of said at least one region, said spatio-temporal range of said at least one region, or a passing time range of said spatial temporal range of each of said at least one region; and said programmable data processing apparatus configured to return calculated trace data or part of said trace data as a search result if said candidate vehicle moves in calculated spatio-temporal ranges within calculated passing time ranges and if said candidate vehicle has said first identifier that is present in both said received first record aggregates and said received second record aggregates, wherein when a first vehicle is within said calculated spatio-temporal range within said calculated passing time range and a second vehicle is within said calculated spatio-temporal range within said calculated passing time range, said programmable data processing apparatus is further configured to:

calculate a first aggregate value from said received first record aggregates and said received second record aggregates including said at least one first attribute value associated with an identifier of the first vehicle, said calculating of the first aggregate value performed using a predetermined function;

replace a first value that represents said at least one first attribute value associated with the identifier of the first vehicle in said received first record aggregates and said received second record aggregates with a second value that represents said at least one second attribute value associated with an identifier of the second vehicle in said received first record aggregates and said received second record aggregates, and calculate a second aggregate value from said received first record aggregates and said received second record aggregates including at least the second value that replaced the first value, the calculating of the second aggregate value performed using the predetermined function;

control selection of the first attribute value to enable the first aggregate value to completely match the second aggregate value; and when the first aggregate value completely matches the second aggregate value, return, as said search result, said calculated trace data related to said candidate vehicle that corresponds to said data search request or said part of said trace data in accordance with an attribute value of said controlled selection of the first attribute value.

16. The system according to claim 15, wherein said programmable data processing apparatus is further configured to restrict disclosure of said calculated trace data or said part of said trace data in accordance with a policy associated with said first identifier that is present in both said received first record aggregates and said received second record aggregates.

17. The system according to claim 15, wherein said programmable data processing apparatus is further configured to restrict disclosure of said calculated trace data or said part of said trace data in accordance with a policy associated with said first identifier that is present in both said received first record aggregates and said received second record aggregates.

18. The system according to claim 16, wherein:
said policy associated with said first identifier comprises constraint data selected from the group consisting of: (i) number of times said trace data related to said first recorded vehicle is being disclosed; (ii) a destination of disclosure of said trace data; and combinations thereof; and
said programmable data processing apparatus is further configured to restrict disclosure of said calculated trace data related to said candidate vehicle that corresponds to said data search request or said part of said trace data in accordance with said constraint data.

19. The system according to claim 17, wherein:
said policy associated with said first identifier comprises constraint data selected from the group consisting of: (i) number of times said trace data related to said first recorded vehicle is being disclosed; (ii) a destination of disclosure of said trace data; and combinations thereof; and
said programmable data processing apparatus is further configured to restrict disclosure of said calculated trace data related to said candidate vehicle that corresponds to said data search request or said part of said trace data in accordance with said constraint data.

20. The system according to claim 15, wherein to calculate said trace data, said programmable data processing apparatus is further configured to:
satisfy a condition that a vehicle passing through L regions that have certain ranges within certain time ranges be fulfilled, and
satisfy a condition that k or more vehicles (k is an integer greater than or equal to 2) are present in each of the L regions, and one of: a passing time range $(s_j, e_j)$ for a range $w_j$ (j is an integer of 1, 2, . . . , L) for each of the L regions, or for the range $w_j$ or both, wherein
the calculated trace data or part of the trace data is returned as a search result when the vehicle passing through L regions having a same identifier in the received first and second record aggregates moves in the calculated ranges $w_j$ within the calculated passing time ranges $(s_j, e_j)$.

21. The system according to claim 18, wherein to return the trace data, said programmable data processing apparatus is further configured to: record said constraint data as a history.

22. The system according to claim 16, further comprising: a policy repository for storing policies for retrieval.

23. The system according to claim 16, wherein said policy is set by a data owner associated with said candidate vehicle or said data provider system.

24. The system according to claim 15, wherein said memory comprises a record repository for storing said received first record aggregates and said received second record aggregates.

25. The system according to claim 23, wherein to calculate trace data, said computing device is further configured to:
- create trace data from first record aggregates and second record aggregates that have been stored in said record repository in response to said data search request.

26. The system according to claim 15, wherein to calculate trace data, said computing device is further configured to:
- integrate said first record aggregates and said second record aggregates into one integrated record aggregate; and
- sort records associated with an identifier in said integrated record aggregate by an order of time data.

27. The system according to claim 15, wherein said at least one attribute value comprises values selected from: at least one identifier of said candidate vehicle, a color of said candidate vehicle, a number of said candidate vehicle, a type of said candidate vehicle, a speed at a time value, a value regarding a device of said candidate vehicle, name, age, or gender of a driver or a passenger, a number of occupants, a state inside or outside said candidate vehicle at said time value, a state of said occupant at said time value, and combinations thereof.

* * * * *